US010560352B2

(12) United States Patent
Gupta et al.

(10) Patent No.: US 10,560,352 B2
(45) Date of Patent: *Feb. 11, 2020

(54) SUBSCRIBER-AWARE TWAMP DATA MONITORING IN COMPUTER NETWORKS

(71) Applicant: Juniper Networks, Inc., Sunnyvale, CA (US)

(72) Inventors: Peyush Gupta, Bangalore (IN); Srivathsa Sarangapani, Bangalore (IN); Sanjay Kumar Gupta, Bangalore (IN)

(73) Assignee: Juniper Networks, Inc., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/277,690

(22) Filed: Feb. 15, 2019

(65) Prior Publication Data
US 2019/0182133 A1  Jun. 13, 2019

Related U.S. Application Data

(63) Continuation of application No. 15/376,617, filed on Dec. 12, 2016, now Pat. No. 10,218,590.

(51) Int. Cl.
*G06F 15/16* (2006.01)
*H04L 12/26* (2006.01)
(Continued)

(52) U.S. Cl.
CPC ............ *H04L 43/06* (2013.01); *H04L 43/087* (2013.01); *H04L 43/0864* (2013.01);
(Continued)

(58) Field of Classification Search
CPC ... H04L 43/06; H04L 43/0864; H04L 43/087; H04L 43/106; H04L 43/50; H04L 67/141; H04L 67/43; H04L 42/5038
See application file for complete search history.

(56) References Cited

U.S. PATENT DOCUMENTS 6,363,478 B1 * 3/2002 Lambert ................. H04L 29/06
                                                      380/262
8,842,578 B1    9/2014 Zisapel et al.
(Continued)

FOREIGN PATENT DOCUMENTS

EP    2629477 A1    8/2013
EP    2690824 A1    1/2014
(Continued)

OTHER PUBLICATIONS

Hedayat et al., "A Two-Way Active Measurement Protocol (TWAMP)," Network Working Group, RFC 5357, Oct. 2008, 26 pp.
(Continued)

*Primary Examiner* — Moustafa M Meky
(74) *Attorney, Agent, or Firm* — Shumaker & Sieffert, P.A.

(57) ABSTRACT

Techniques are described for performing subscriber aware two-way active measurement protocol (TWAMP) data session provisioning between two endpoints in a computer network. For example, the disclosed techniques include extending TWAMP control messaging to include a communication mode for negotiating subscriber-aware TWAMP data monitoring. If the communication mode is supported by both endpoints, a subscriber identifier is specified when a TWAMP data session is provisioned (negotiated) over the control session. The disclosed techniques further include extending TWAMP data messaging to include the subscriber identifier in each test packet for the data session. In this way, each of the endpoints may identify a subscriber corresponding to one or more received TWAMP test packets based on the subscriber identifier included in the received TWAMP test packets.

14 Claims, 16 Drawing Sheets

(51) Int. Cl.
*H04L 29/06* (2006.01)
*H04L 29/08* (2006.01)
*H04L 12/24* (2006.01)

(52) U.S. Cl.
CPC ............ *H04L 43/106* (2013.01); *H04L 43/50* (2013.01); *H04L 67/141* (2013.01); *H04L 67/42* (2013.01); *H04L 41/5038* (2013.01)

(56) References Cited

U.S. PATENT DOCUMENTS

| | | | |
|---|---|---|---|
| 8,843,738 B2* | 9/2014 | Vos | H04L 63/08 |
| | | | 713/151 |
| 9,131,026 B2* | 9/2015 | Hu | H04L 65/1069 |
| 9,154,532 B2 | 10/2015 | Gutierrez | |
| 9,306,830 B2 | 4/2016 | Robitaille | |
| 9,419,883 B2 | 8/2016 | Wallman et al. | |
| 9,426,042 B2 | 8/2016 | Park et al. | |
| 9,531,621 B2 | 12/2016 | Kolhi et al. | |
| 9,563,900 B1 | 2/2017 | Guo et al. | |
| 9,705,769 B1 | 7/2017 | Sarangapani et al. | |
| 9,923,796 B2 | 3/2018 | Mirsky | |
| 9,960,982 B2 | 5/2018 | Nydell | |
| 9,998,565 B2 | 6/2018 | Gupta et al. | |
| 10,021,216 B2 | 7/2018 | Gupta et al. | |
| 10,063,449 B2 | 8/2018 | Mirsky et al. | |
| 10,110,455 B2 | 10/2018 | Sarangapani et al. | |
| 10,218,590 B2* | 2/2019 | Gupta | H04L 43/06 |
| 2012/0128000 A1 | 5/2012 | Baillargeon et al. | |
| 2013/0138822 A1* | 5/2013 | Hu | H04L 65/1069 |
| | | | 709/227 |
| 2013/0305036 A1* | 11/2013 | Vos | H04L 63/08 |
| | | | 713/151 |
| 2014/0029441 A1 | 1/2014 | Nydell | |
| 2014/0029442 A1 | 1/2014 | Wallman et al. | |
| 2014/0098679 A1 | 4/2014 | Baillargeon | |
| 2014/0169180 A1 | 6/2014 | Wallman | |
| 2014/0169183 A1 | 6/2014 | Allan et al. | |
| 2014/0226507 A1 | 8/2014 | Bonnier et al. | |
| 2015/0058479 A1 | 2/2015 | Kolhi et al. | |
| 2015/0109952 A1 | 4/2015 | Baillargeon et al. | |
| 2016/0014213 A1 | 1/2016 | Ajitomi et al. | |
| 2016/0026490 A1 | 1/2016 | Johnsson et al. | |
| 2016/0028603 A1 | 1/2016 | Chakrabarti et al. | |
| 2016/0073279 A1 | 3/2016 | Johnsson et al. | |
| 2016/0191367 A1 | 6/2016 | Mirsky et al. | |
| 2016/0191632 A1 | 6/2016 | Mirsky et al. | |
| 2016/0330092 A1 | 11/2016 | Wallman | |
| 2016/0352865 A1 | 12/2016 | Gupta et al. | |
| 2016/0352866 A1 | 12/2016 | Gupta et al. | |
| 2017/0019323 A1 | 1/2017 | Allan et al. | |
| 2017/0289011 A1 | 10/2017 | Johnsson et al. | |
| 2017/0373950 A1 | 12/2017 | Szilagyi et al. | |
| 2018/0077032 A1 | 3/2018 | Park et al. | |
| 2018/0091603 A1 | 3/2018 | Sarangapani et al. | |
| 2018/0107577 A1 | 4/2018 | Johnsson et al. | |
| 2018/0167294 A1 | 6/2018 | Gupta et al. | |
| 2018/0219758 A1 | 8/2018 | Nydell | |
| 2018/0288194 A1 | 10/2018 | Gupta et al. | |

FOREIGN PATENT DOCUMENTS

| | | |
|---|---|---|
| EP | 2765740 A1 | 8/2014 |
| EP | 3099016 A1 | 11/2016 |
| WO | 2013184846 A1 | 12/2013 |
| WO | 2014168530 A1 | 10/2014 |

OTHER PUBLICATIONS

Shalunov et al., "A One-Way Active Measurement Protocol (OWAMP)," Network Working Group, RFC 4656, Sep. 2006, 56 pp.
Mirsky et al., "UDP Port Allocation for the Receiver Port in Two-Way Active Measurement Protocol (TWAMP)," Network Working Group, Internet-Draft, Updates 5357, Jun. 14, 2016, 5 pp.
Perumal et al., "Network Address Translator (NAT) Considerations for IP Performance Metrics (IPPM) Active Measurement Protocols," Network Working Group, Internet-Draft, Jul. 6, 2016, 7 pp.
Extended Search Report from counterpart European Application No. 17198852.0, dated Apr. 16, 2018, 11 pp.
Notice of Allowance dated Oct. 16, 2018 in counterpart U.S. Appl. No. 15/376,617, 9 pp.
Response filed Dec. 11, 2018 to the Extended Search Report from counterpart European Application No. 17198852.0, dated Apr. 16, 2018, 25 pp.
Communication pursuant to Article 94(3) EPC dated Sep. 30, 2019 in counterpart EP Application No. 1719852.0, 5 pp.

* cited by examiner

```
                                                                        190
       0                   1                   2                   3
192    0 1 2 3 4 5 6 7 8 9 0 1 2 3 4 5 6 7 8 9 0 1 2 3 4 5 6 7 8 9 0 1
      +-+-+-+-+-+-+-+-+-+-+-+-+-+-+-+-+-+-+-+-+-+-+-+-+-+-+-+-+-+-+-+-+
      |         service id            |         MBZ (2 octets)        |
194   +-+-+-+-+-+-+-+-+-+-+-+-+-+-+-+-+-+-+-+-+-+-+-+-+-+-+-+-+-+-+-+-+
      |              Service description string (32 octets)           |
      |                                                               |
      |                                                               |
      |                                                               |
      +-+-+-+-+-+-+-+-+-+-+-+-+-+-+-+-+-+-+-+-+-+-+-+-+-+-+-+-+-+-+-+-+
```

FIG. 9

```
                                                                        200
       0                   1                   2                   3
       0 1 2 3 4 5 6 7 8 9 0 1 2 3 4 5 6 7 8 9 0 1 2 3 4 5 6 7 8 9 0 1
      +-+-+-+-+-+-+-+-+-+-+-+-+-+-+-+-+-+-+-+-+-+-+-+-+-+-+-+-+-+-+-+-+
      |                                                               |
      |                         HMAC (16 octets)                      |
      |                                                               |
      |                                                               |
      +-+-+-+-+-+-+-+-+-+-+-+-+-+-+-+-+-+-+-+-+-+-+-+-+-+-+-+-+-+-+-+-+
```

FIG. 10

```
    0                   1                   2                   3
    0 1 2 3 4 5 6 7 8 9 0 1 2 3 4 5 6 7 8 9 0 1 2 3 4 5 6 7 8 9 0 1
   +-+-+-+-+-+-+-+-+-+-+-+-+-+-+-+-+-+-+-+-+-+-+-+-+-+-+-+-+-+-+-+-+
   |                       Sequence Number                         |
   +-+-+-+-+-+-+-+-+-+-+-+-+-+-+-+-+-+-+-+-+-+-+-+-+-+-+-+-+-+-+-+-+
   |                         MBZ (12 octets)                       |
   |                                                               |
   |                                                               |
   +-+-+-+-+-+-+-+-+-+-+-+-+-+-+-+-+-+-+-+-+-+-+-+-+-+-+-+-+-+-+-+-+
   |                        Timestamp (T3)                         |
   |                                                               |
   +-+-+-+-+-+-+-+-+-+-+-+-+-+-+-+-+-+-+-+-+-+-+-+-+-+-+-+-+-+-+-+-+
   |     Error Estimate      |                                     |
   +-+-+-+-+-+-+-+-+-+-+-+-+-+                                     +
   |                         MBZ (6 octets)                        |
   +-+-+-+-+-+-+-+-+-+-+-+-+-+-+-+-+-+-+-+-+-+-+-+-+-+-+-+-+-+-+-+-+
   |                    Receive Timestamp (T2)                     |
   |                                                               |
   +-+-+-+-+-+-+-+-+-+-+-+-+-+-+-+-+-+-+-+-+-+-+-+-+-+-+-+-+-+-+-+-+
   |                         MBZ (8 octets)                        |
   |                                                               |
   +-+-+-+-+-+-+-+-+-+-+-+-+-+-+-+-+-+-+-+-+-+-+-+-+-+-+-+-+-+-+-+-+
   |                     Sender Sequence Number                    |
   +-+-+-+-+-+-+-+-+-+-+-+-+-+-+-+-+-+-+-+-+-+-+-+-+-+-+-+-+-+-+-+-+
   |                         MBZ (12 octets)                       |
   |                                                               |
   |                                                               |
   +-+-+-+-+-+-+-+-+-+-+-+-+-+-+-+-+-+-+-+-+-+-+-+-+-+-+-+-+-+-+-+-+
   |                     Sender Timestamp (T1)                     |
   |                                                               |
   +-+-+-+-+-+-+-+-+-+-+-+-+-+-+-+-+-+-+-+-+-+-+-+-+-+-+-+-+-+-+-+-+
   |    Sender Error Estimate   |                                  |
   +-+-+-+-+-+-+-+-+-+-+-+-+-+-+-+                                 +
   |                         MBZ (6 octets)                        |
   +-+-+-+-+-+-+-+-+-+-+-+-+-+-+-+-+-+-+-+-+-+-+-+-+-+-+-+-+-+-+-+-+
   | Sender TTL   |                                                |
   +-+-+-+-+-+-+-+-+                                               +
   |                                                               |
   |                         MBZ (15 octets)                       |
   |                                                               |
   +-+-+-+-+-+-+-+-+-+-+-+-+-+-+-+-+-+-+-+-+-+-+-+-+-+-+-+-+-+-+-+-+
   |                         HMAC (16 octets)                      |
   |                                                               |
   +-+-+-+-+-+-+-+-+-+-+-+-+-+-+-+-+-+-+-+-+-+-+-+-+-+-+-+-+-+-+-+-+
   |       Sub ID Type        |         Size of Sub ID             |
   +-+-+-+-+-+-+-+-+-+-+-+-+-+-+-+-+-+-+-+-+-+-+-+-+-+-+-+-+-+-+-+-+
   |                                                               |
   |                     Subscriber ID (20 octets)                 |
   |                                                               |
   +-+-+-+-+-+-+-+-+-+-+-+-+-+-+-+-+-+-+-+-+-+-+-+-+-+-+-+-+-+-+-+-+
   |        Service latency measurement Sender Timestamp (T5)      |
   |                                                               |
   +-+-+-+-+-+-+-+-+-+-+-+-+-+-+-+-+-+-+-+-+-+-+-+-+-+-+-+-+-+-+-+-+
   |       Service latency measurement Receiver Timestamp (T6)     |
   |                                                               |
   +-+-+-+-+-+-+-+-+-+-+-+-+-+-+-+-+-+-+-+-+-+-+-+-+-+-+-+-+-+-+-+-+
   |                     Packet Padding/Service PDU                |
   |                                                               |
   +-+-+-+-+-+-+-+-+-+-+-+-+-+-+-+-+-+-+-+-+-+-+-+-+-+-+-+-+-+-+-+-+
```

FIG. 15

SUBSCRIBER-AWARE TWAMP DATA MONITORING IN COMPUTER NETWORKS

This application is a continuation of U.S. application Ser. No. 15/376,617 filed Dec. 12, 2016, the entire contents of which are incorporated by reference herein.

TECHNICAL FIELD

The disclosure relates to computer networks.

BACKGROUND

Over the last few decades, the Internet has grown exponentially from a small network comprising of few nodes to a worldwide pervasive network that services more than a billion users. Today, individual subscribers are not limited to running a few network sessions with voice and/or data downloads over the network. Instead, the extent of services utilized by subscribers varies widely from multimedia gaming, audio and video streaming, web services, voice over IP (VoIP), and the like. With new technology penetration, such as increased utilization of Internet of Things (IoT) and M2M (machine to machine) communications, the network services and the software applications that a given subscriber may require also varies from a few sessions to multiple sessions having concurrent flows. This number is growing rapidly every day as subscribers increasingly run multiple applications, services, transactions simultaneously. The increased amount and variety of subscriber sessions and packet flows create challenges for network service providers with respect to network performance, such as latency, delay, and jitter.

SUMMARY

In general, this disclosure is directed to techniques for performing subscriber-aware data monitoring of network performance using a two-way active measurement protocol (TWAMP) in a computer network. For example, the disclosed techniques include extending TWAMP control messaging to include a communication mode for negotiating subscriber-aware TWAMP data monitoring. If the communication mode is supported by both endpoints, a subscriber identifier is specified when a TWAMP data session is provisioned (negotiated) over the control session. The disclosed techniques further include extending TWAMP data messaging to include the subscriber identifier in each test packet for the data session. In this way, each of the endpoints may identify a subscriber corresponding to one or more received TWAMP test packets based on the subscriber identifier included in the received TWAMP test packets.

The techniques described herein may provide certain technical advantages. For example, the technique may more efficiently and accurately allow service providers to monitor key performance indicators (KPIs), such as latency, delay, jitter, call setup time, throughput, bandwidth for individual subscribers and subscriber profiles. This, in turn, may allow the service provider networks to better improve and/or optimize their network architecture and allocation of network resources for their subscribers. In addition, the network service provider may improve delivery of subscriber-aware network services, such as traffic detection functions (TDFs), deep packet inspection (DPI), content delivery services and the like. In one example, the subscriber-specific traffic flows may be sourced by actual subscriber devices such that the techniques described herein may be used to measure KPIs for actual subscriber traffic in real-time or pseudo real-time. As a second example, the subscriber-traffic flows may be sourced by one or more test devices for measuring KPIs for simulated subscriber traffic.

In one example, this disclosure is directed to a method comprising establishing a control connection between a two-way active measurement protocol (TWAMP) control client and a TWAMP server and negotiating, by the TWAMP control client and the TWAMP server over the control connection, a data session between a TWAMP session sender executed on a first network device and a TWAMP session reflector executed on a second network device, wherein negotiating the data session includes specifying a subscriber identifier to an individual subscriber of a service provider network. The method further comprises exchanging one or more TWAMP test packets for the data session between the TWAMP session sender and the TWAMP session reflector, each of the one or more TWAMP test packets including the subscriber identifier of the subscriber.

In another example, this disclosure is directed to a network device comprising a memory, and one or more processors in communication with the memory. The one or more processors execute a TWAMP control client and a TWAMP session sender and are configured to establish a control connection between the TWAMP control client and the TWAMP server and negotiate a data session between the TWAMP session sender and a TWAMP session reflector executed on a second network device, wherein negotiating the data session includes specifying a subscriber identifier for an individual subscriber of a service provider network. The processor is further configured to send the one or more TWAMP test packets for the data session to the TWAMP session reflector, each of the one or more TWAMP test packets including the subscriber identifier, and receive the one or more TWAMP test packets back from the TWAMP session reflector, each of the one or more TWAMP test packets including the subscriber identifier and at least one metric for the data session used to measure network performance between the first network device and the second network device.

In an additional example, this disclosure is directed to a network device comprising a memory, and one or more processors in communication with the memory. The one or more processors execute a TWAMP server and a TWAMP session reflector and are configured to establish a control connection between the TWAMP server and a TWAMP control client and receive, with the TWAMP server and from the TWAMP control client, a TWAMP session request for a data session between the TWAMP session reflector and a TWAMP session sender executed on another network device, wherein the TWAMP session request specifies a subscriber identifier to an individual subscriber of a service provider network. The processor is further configured to receive one or more TWAMP test packets for the data session by the TWAMP session reflector from the TWAMP session sender, each of the one or more TWAMP test packets including the subscriber identifier associated with the data session and send, by the TWAMP session reflector, the one or more TWAMP test packets back to the TWAMP session sender, each of the one or more TWAMP test packets including the subscriber identifier associated with the data session and at least one metric for the data session used to measure network performance between the first network device and the second network device.

The details of one or more examples are set forth in the accompanying drawings and the description below. Other features, objects, and advantages will be apparent from the description and drawings, and from the claims.

BRIEF DESCRIPTION OF DRAWINGS

FIGS. 6-11 are conceptual diagrams illustrating example formats of TWAMP control messages between a TWAMP control client and a TWAMP server, in accordance with the techniques of this disclosure.

FIGS. 14-15 illustrates example format of a TWAMP reply message in accordance with the techniques described herein.

DETAILED DESCRIPTION

Figure 1:
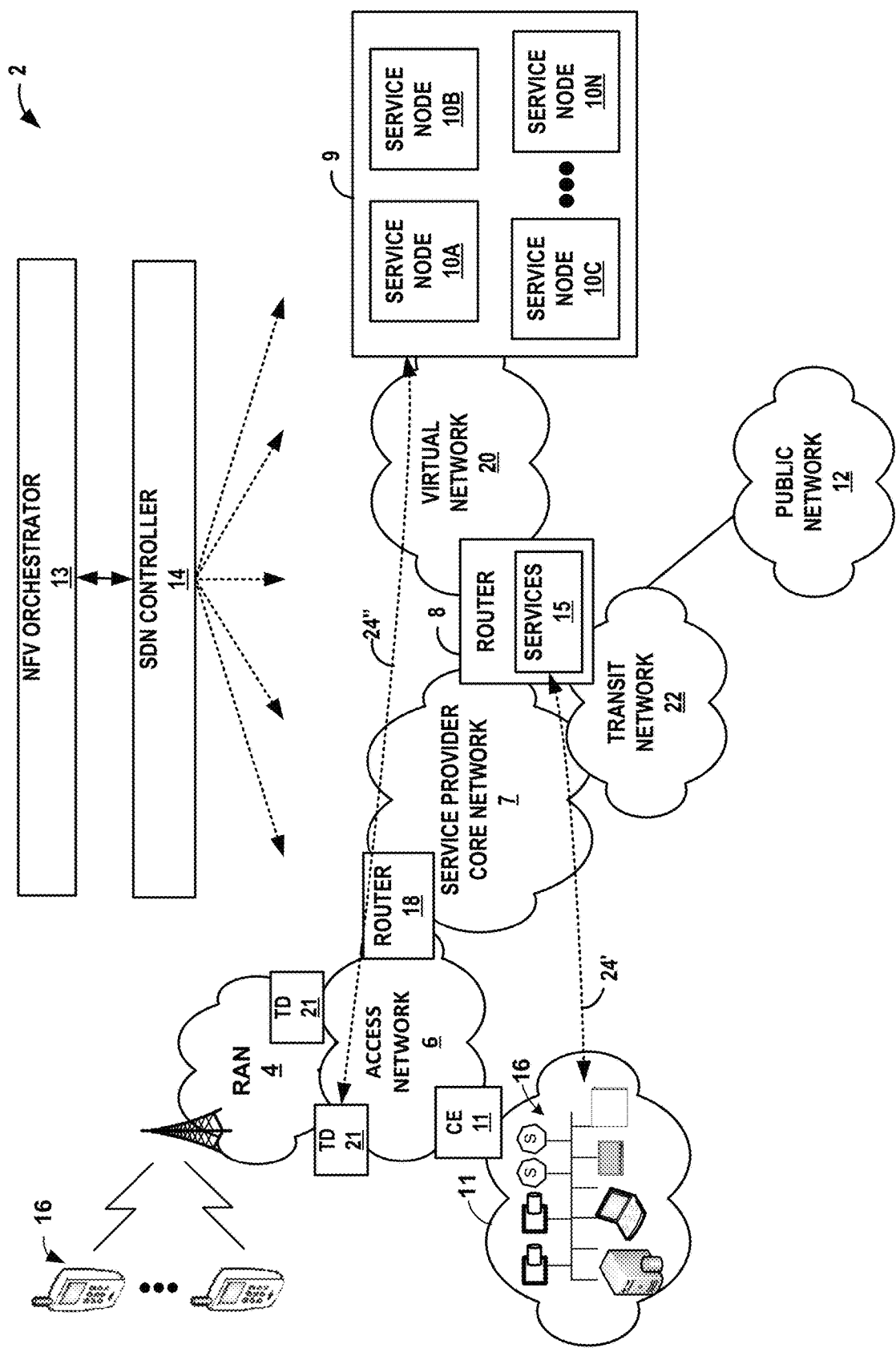
FIG. 1 is a block diagram illustrating an example network system that performs subscriber-aware data monitoring using two-way active measurement protocol (TWAMP) in accordance with the examples described herein.

FIG. 1 is a block diagram illustrating an example network system that performs subscriber-aware data monitoring using two-way active measurement protocol (TWAMP) in accordance with the examples described herein. The example network system of FIG. 1 includes a service provider network 2 that operates as a private network to provide packet-based network services to subscriber devices 16. That is, service provider network 2 provides authentication and establishment of network access for subscriber devices 16 such that a subscriber device may begin exchanging data packets with public network 12, which may be an internal or external packet-based network such as the Internet.

In the example of FIG. 1, service provider network 2 comprises access network 6 that provides connectivity to public network 12 via service provider core network 7 (hereinafter, "core network 7") and router 8. Core network 7 and public network 12 provide packet-based services that are available for request and use by subscriber devices 16. As examples, core network 7 and/or public network 12 may provide bulk data delivery, voice over Internet protocol (VoIP), Internet Protocol television (IPTV), Short Messaging Service (SMS), Wireless Application Protocol (WAP) service, or customer-specific application services. Public network 12 may comprise, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates access network 6, an enterprise IP network, or some combination thereof. In various examples, public network 12 is connected to a public WAN, the Internet, or to other networks. Public network 12 executes one or more packet data protocols (PDPs), such as IP (IPv4 and/or IPv6), X.25 or Point-to-Point Protocol (PPP), to enable packet-based transport of public network 12 services.

In general, subscriber devices 16 connect to gateway router 8 via access network 6 to receive connectivity to subscriber services for applications hosted by subscriber devices 16. A subscriber may represent, for instance, an enterprise, a residential subscriber, or a mobile subscriber. Subscriber devices 16 may be, for example, personal computers, laptop computers or other types of computing devices positioned behind customer equipment (CE) 11, which may provide local routing and switching functions. Each of subscriber devices 16 may run a variety of software applications, such as word processing and other office support software, web browsing software, software to support voice calls, video games, video conferencing, and email, among others. For example, subscriber device 16 may be a variety of network-enabled devices, referred generally to as "Internet-of-Things" (IoT) devices, such as cameras, sensors (S), televisions, appliances, etc. In addition, subscriber devices 16 may comprise mobile devices that access the data services of service provider network 2 via a radio access network (RAN) 6. Example mobile subscriber devices include mobile telephones, laptop or desktop computers having, e.g., a 3G wireless card, wireless-capable netbooks, video game devices, pagers, smart phones, personal data assistants (PDAs) or the like.

A network service provider operates, or in some cases leases, elements of access network 6 to provide packet transport between subscriber devices 16 and router 8. Access network 6 represents a network that aggregates data traffic from one or more of subscriber devices 16 for transport to/from core network 7 of the service provider. Access network 6 includes network nodes that execute communication protocols to transport control and user data to facilitate communication between subscriber devices 16 and router 8. Access network 6 may include a broadband access network, a wireless LAN, a public switched telephone network (PSTN), a customer premises equipment (CPE) network, or other type of access network, and may include or otherwise provide connectivity for cellular access networks, such as a radio access network (RAN) (not shown). Examples include networks conforming to a Universal Mobile Telecommunications System (UMTS) architecture, an evolution of UMTS referred to as Long Term Evolution (LTE), mobile IP standardized by the Internet Engineering Task Force (IETF), as well as other standards proposed by the $3^{rd}$ Generation Partnership Project (3GPP), $3^{rd}$ Generation Partnership Project 2 (3GPP/2) and the WiMAX forum.

Router 18 may be a customer edge (CE) router, a provider edge (PE) router, or other network device between access network 6 and core network 7. Core network 7 offers packet-based connectivity to subscriber devices 16 attached to access network 6 for accessing public network 12 (e.g., the Internet). Core network 7 may represent a public network that is owned and operated by a service provider to interconnect a plurality of networks, which may include access network 6. Core network 7 may implement Multi- Protocol Label Switching (MPLS) forwarding and in such instances may be referred to as an MPLS network or MPLS backbone. In some instances, core network 7 represents a plurality of interconnected autonomous systems, such as the Internet, that offers services from one or more service providers. Public network 12 may represent the Internet. Public network 12 may represent an edge network coupled to core network 7 via a transit network 22 and one or more network devices, e.g., a customer edge device such as customer edge switch or router. Public network 12 may include a data center. Router 8 may exchange packets with service nodes 10 via virtual network 20, and router 8 may forward packets to public network 12 via transit network 22.

In examples of network 2 that include a wireline/broadband access network, router 8 may represent a Broadband Network Gateway (BNG), Broadband Remote Access Server (BRAS), MPLS PE router, core router or gateway, or Cable Modem Termination System (CMTS). In examples of network 2 that include a cellular access network as access network 6, router 8 may represent a mobile gateway, for example, a Gateway General Packet Radio Service (GPRS) Serving Node (GGSN), an Access Gateway (aGW), or a Packet Data Network (PDN) Gateway (PGW). In other examples, the functionality described with respect to router 8 may be implemented in a switch, service card or another network element or component. In some examples, router 8 may itself be a service node.

A network service provider that administers at least parts of network 2 typically offers services to subscribers associated with devices, e.g., subscriber devices 16, that access service provider network 2. Services offered may include, for example, traditional Internet access, VoIP, video and multimedia services, and security services. As described above with respect to access network 6, core network 7 may support multiple types of access network infrastructures that connect to service provider network access gateways to provide access to the offered services. In some instances, the network system may include subscriber devices 16 that attach to multiple different access networks 6 having varying architectures.

In general, any one or more of subscriber devices 16 may request authorization and data services by sending a session request to a gateway device such as router 18 or router 8. In turn, router 18 may access a central server (not shown) such as an Authentication, Authorization and Accounting (AAA) server to authenticate the one of subscriber devices 16 requesting network access. Once authenticated, any of subscriber devices 16 may send subscriber data traffic toward core network 7 to access and receive services provided by public network 12, and such packets may traverse router 8 as part of at least one packet flow. In some examples, router 18 may forward all authenticated subscriber traffic to public network 12, and router 8 may apply services 15 and/or steer particular subscriber traffic to a data center 9 if the subscriber traffic requires services on service nodes 10. Applications (e.g., service applications) to be applied to the subscriber traffic may be hosted on service nodes 10.

For example, when forwarding subscriber traffic, router 8 may direct individual subscriber packet flows through services 15 executing on one or more service cards installed within router 9. In addition, or alternatively, service provider network 2 includes a data center 9 having a cluster of service nodes 10 that provide an execution environment for the mostly virtualized network services. In some examples, each of service nodes 10 represents a service instance. Each of service nodes 10 may apply one or more services to traffic flows. As such, router 8 may steer subscriber packet flows through defined sets of services provided by service nodes 10. That is, in some examples, each subscriber packet flow may be forwarded through a particular ordered combination of services provided by service nodes 10, each ordered set being referred to herein as a "service chain." As examples, services 15 and/or service nodes 10 may apply stateful firewall (SFW) and security services, deep packet inspection (DPI), carrier grade network address translation (CGNAT), traffic destination function (TDF) services, media (voice/video) optimization, Internet Protocol security (IPSec)/virtual private network (VPN) services, hypertext transfer protocol (HTTP) filtering, counting, accounting, charging, and/or load balancing of packet flows, or other types of services applied to network traffic.

In the example of FIG. 1, subscriber packet flows may be directed along a service chain that includes any of services 15 and/or services applied by service nodes 10. Once processed at a terminal node of the service chain, i.e., the last service to be applied to packets flowing along a particular service path, the traffic may be directed to public network 12.

Whereas a "service chain" defines one or more services to be applied in a particular order to provide a composite service for application to packet flows bound to the service chain, a "service tunnel" or "service path" refers to a logical and/or physical path taken by packet flows processed by a service chain along with the forwarding state for forwarding packet flows according to the service chain ordering. Each service chain may be associated with a respective service tunnel, and packet flows associated with each subscriber device 16 flow along service tunnels in accordance with a service profile associated with the respective subscriber. For example, a given subscriber may be associated with a particular service profile, which in turn is mapped to a service tunnel associated with a particular service chain. Similarly, another subscriber may be associated with a different service profile, which in turn is mapped to a service tunnel associated with a different service chain. In some examples, after router 18 has authenticated and established access sessions for the subscribers, router 18 or router 8 may direct packet flows for the subscribers along the appropriate service tunnels, thereby causing data center 9 to apply the requisite ordered services for the given subscriber. In some examples, SDN controller 14 may also provide a forwarding rule set to router 18 or router 8 for managing the forwarding path. In some examples, SDN controller 14 manages the forwarding path through all elements in data center 9 starting at router 8.

In some examples, service nodes 10 may implement service chains using internally configured forwarding state that directs packets of the packet flow along the service chains for processing according to the identified set of service nodes 10. Such forwarding state may specify tunnel interfaces for tunneling between service nodes 10 using network tunnels such as IP or Generic Route Encapsulation (GRE) tunnels, Network Virtualization using GRE (NVGRE), or by using VLANs, Virtual Extensible LANs (VXLANs), MPLS techniques, and so forth. In some instances, real or virtual switches, routers or other network elements that interconnect service nodes 10 may be configured to direct the packet flow to the service nodes 10 according to service chains.

In the example of FIG. 1, service provider network 2 comprises a software defined network (SDN) and network functions virtualization (NFV) architecture. SDN controller device 14 may provide a high-level controller for configuring and managing the routing and switching infrastructure of service provider network 2. NFV orchestrator device 13 may provide a high-level orchestrator for configuring and managing virtualization of network services into service nodes 10 of data center 9. In some instances, SDN controller 14 manages deployment of virtual machines (VMs) within the operating environment of data center 9. For example, SDN controller 14 may interact with provider edge (PE) router 8 to specify service chain information, described in more detail below. For example, the service chain information provided by SDN controller 14 may specify any combination and ordering of services provided by service nodes 10, traffic engineering information for tunneling or otherwise transporting packet flows along service paths, rate limits, Type of Service (TOS) markings or packet classifiers that specify criteria for matching packet flows to a particular service chain. Further example details of an SDN controller are described in PCT International Patent Application PCT/US13/44378, filed Jun. 5, 2013, the entire content of which is incorporated herein by reference.

Although illustrated as part of data center 9, service nodes 10 may be network devices coupled by one or more switches or virtual switches of core network 7. In one example, each of service nodes 10 may run as VMs in a virtual compute environment. Moreover, the compute environment may comprise a scalable cluster of general computing devices, such as x86 processor-based servers. As another example, service nodes 10 may comprise a combination of general purpose computing devices and special purpose appliances. As virtualized network services, individual network services provided by service nodes 10 can scale just as in a modern data center through the allocation of virtualized memory, processor utilization, storage and network policies, as well as horizontally by adding additional load-balanced VMs. In other examples, service nodes 10 may be gateway devices or other routers. In further examples, the functionality described with respect to each of service nodes 10 may be implemented in a switch, service card, or another network element or component.

As described herein, elements within network system 2 perform subscriber-aware data monitoring using two-way active measurement protocol (TWAMP). That is, TWAMP may be used within service provider network 2 to measure both one-way and two-way or round trip metrics of network performance, such as path connectivity, path delay, packet jitter, packet loss, packet re-ordering, and the like, on a per-subscriber basis between network devices, also referred to as hosts or endpoints. In general, a TWAMP measurement architecture includes at least two network devices that each support TWAMP and perform specific roles to start data sessions and exchange test packets for the data sessions. In the example network architecture illustrated in FIG. 1, subscriber-aware TWAMP as described herein may be used to measure key performance indicators for subscriber-specific traffic flows. In one example, the subscriber-specific traffic flows may be sourced by subscriber devices 16 such that the techniques described herein may be used to measure KPIs for real-time or pseudo real-time subscriber traffic. As a second example, the subscriber-traffic flows may be sourced by one or more test devices 21 for measuring KPIs for simulated subscriber traffic. In this example, the logical roles of a TWAMP control client and a TWAMP session sender are both performed by subscriber devices 16 or TDs 21, and the logical roles of a TWAMP server and a TWAMP session reflector are both performed by router 8 or service nodes 10.

In alternative TWAMP architectures, each of the logical roles may be executed on a different host or endpoint. In still other example architectures, the TWAMP control client may be executed on SDN controller 14 that acts as a distributed control plane for the first and/or second endpoints, e.g., subscriber devices 16, router 8 or service node 10A. Although described herein with respect to measuring network performance for network services, the extended subscriber-aware TWAMP described herein may also be applied to measure network performance unrelated to network services between any two endpoints, e.g., router 18 and router 8.

As further described herein, the TWAMP control clients executing on subscriber devices 16 or TDs 21 and the TWAMP server executed on router 8 or service nodes 10 establish a control connection and use TWAMP control messaging to initiate, start, and stop TWAMP data sessions 24', 24" (collectively "TWAMP data sessions 24"). That is, the techniques described in this disclosure extend TWAMP such that one or more subscriber-aware TWAMP data sessions 24 may be provisioned between any given subscriber device 16 or TD 21 and a second network device, such as router 8 and/or service nodes 10. In addition, according to the techniques, the TWAMP control client executing on subscriber device 16 or TD 21 may optionally utilize the extended TWAMP to identify a set of services available from router 8 and/or service nodes 10 and, based on the set of services, may establish a TWAMP data session 24 as a service-specific TWAMP data session designed to test and monitor performance metrics for the specific service(s) as applied to particular subscriber flows. As described, TWAMP is extended to allow the requesting subscriber device 16 or TD 21 to specify a subscriber identifier (SUB-ID) and, optionally, a service identifier (SERVICE-ID), where the SUB-ID uniquely identifies the subscriber, such as an IP address for a network-enabled device or an IMSE/IMEI for a mobile device, and the SERVICE-ID corresponds to a particular service or combination of services provided by router 8 and/or service nodes 10.

Upon receiving the modified request, the TWAMP server executing on router 8 or a service node 10 configures internal forwarding information to allow the TWAMP client on the requesting subscriber device 16 or TD 21 to test and monitor performance for specific subscriber traffic using TWAMP data session 24. For example, once a data session 24 is established, a TWAMP session sender executed on the particular subscriber device 16 or TD 21 and the TWAMP session reflector executed on router 8 or service node 10 use TWAMP data messaging to exchange test packets for data session 24 that carry one or more metrics used to measure network performance for subscriber traffic flows.

The TWAMP session reflector within router 8 or service node 10 may, for example, strip data packets encapsulated within the test packets and forward the data packets for application of one or more network services. After the services are applied, the resultant packets are directed back to the TWAMP session reflector, encapsulated as TWAMP test packets and sent back to the TWAMP client executing on the particular subscriber device 16 or TD 21. The TWAMP client extracts timestamps embedded within the TWAMP packets, thus allowing latency measures to be calculated for individual subscribers and, optionally, specific services or combinations of services applied to traffic flow for the particular subscribers. In some examples, data sessions 24 may be associated with a different network performance metrics and/or different subscribers. In other examples, each of the multiple data sessions may be associated with a different network service or combination of services, i.e., service chain provided by services 15 of router 8 or any of service nodes 10.

In some examples, the metrics carried by TWAMP test packets may include one or more of timestamps for sending or receiving a test packet, error estimates for sending or receiving the test packet, a sequence number for sending the test packet, a time-to-live (TTL) value for the test packet, a keepalive packet data unit (PDU), and/or a count of serviced packets, bytes, or subscribers. The one-way and two-way network performance measurements may include keepalive or path connectivity, round trip time (RTT), path delay, packet jitter, packet re-ordering, packet loss, service latency measurements, or service load measurements based on the received metrics.

TWAMP is described in more detail in RFC 5357 (Hedayat, et al., "A Two-Way Active Measurement Protocol (TWAMP)," Internet Engineering Task Force (IETF), Network Working Group, RFC 5357, October 2008), the entire content of which is incorporated herein by reference. TWAMP is based on one-way active measurement protocol (OWAMP), which may be used to measure one-way metrics of network performance between network devices. OWAMP is described in more detail in RFC 4656 (Shalunov, et al., "A One-Way Active Measurement Protocol (OWAMP)," Internet Engineering Task Force (IETF), Network Working Group, RFC 4656, September 2006), the entire content of which is incorporated herein by reference.

Extensions to TWAMP to operate within a SDN and NFV architecture, in which a TWAMP control client is executed on a SDN controller, are described in more detail in U.S. application Ser. No. 14/755,961, filed Jun. 30, 2015, the entire content of which is incorporated herein by reference. Extensions to TWAMP to support selection and measurement of service key performance indicators (KPIs) are described in more detail in U.S. application Ser. No. 14/755,986, filed Jun. 30, 2015, the entire content of which is incorporated herein by reference. Techniques for performing service latency measurements using TWAMP is described in more detail in U.S. application Ser. No. 14/573,167, filed Dec. 17, 2014, the entire content of which is incorporated herein by reference. Additional details of example techniques for performing session identifier ("SID")-based two-way active measurement protocol (TWAMP) data session provisioning between two endpoints in a computer network are described in India Application No. 201641033262, entitled "SESSION-IDENTIFIER BASED TWAMP DATA SESSION PROVISIONING IN COMPUTER NETWORKS," the entire contents of which are incorporated herein by reference.

The disclosed techniques include extending TWAMP control messaging to include a communication mode for the subscriber-aware TWAMP data session provisioning. In this way, support for subscriber-aware TWAMP data session provisioning may be negotiated by the TWAMP control client executed on any of subscriber devices 16 and the TWAMP server executed on router 8 or a service node 10 during establishment of the control connection. The disclosed techniques further include extending TWAMP data messaging to include the subscriber identifier (SUB-ID) in each test packet for the data session. In this way, the TWAMP session sender executed on a given subscriber device 16 and the TWAMP session reflector executed on router 8 or service node 10 may associate received test packets for a data session 24 with a particular subscriber and, optionally, a particular set of one or more services (e.g., service chain) based on the SUB-ID included in the received test packets.

The disclosed techniques may provide certain technical advantages. For example, the subscriber aware technique may more efficiently and accurately allow service providers to monitor key performance indicators (KPIs), such as latency, delay, jitter, call setup time, throughput, bandwidth per session, etc. for individual subscribers for specific services. This, in turn, may allow the service provider networks to better improve and/or optimize their network architecture and allocation of network resources. In addition, the network service provider may improve delivery of subscriber aware network services, such as traffic detection functions (TDFs), deep packet inspection (DPI), content delivery services and the like.

Figure 2:
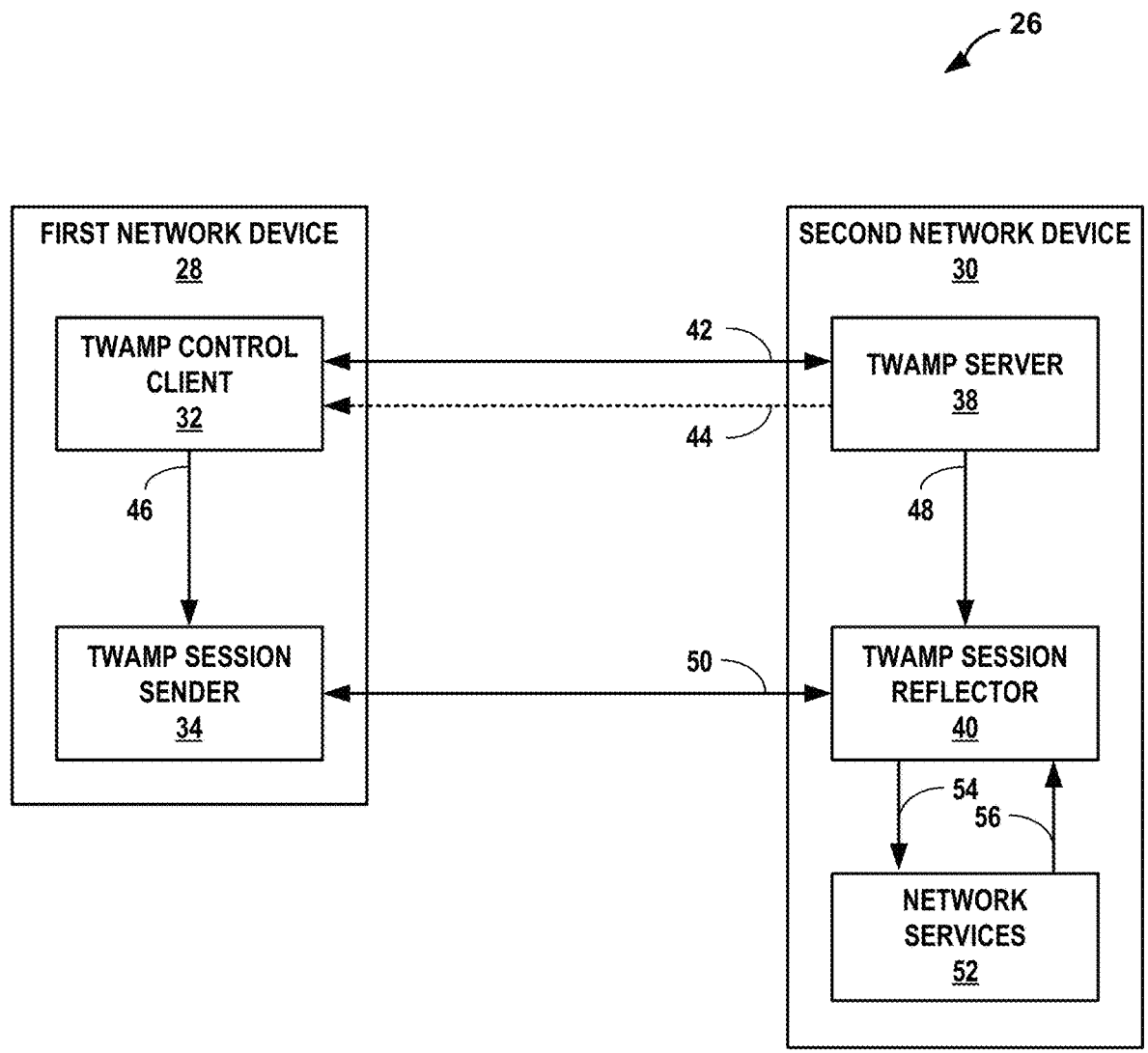
FIG. 2 is a block diagram illustrating an example TWAMP architecture including network devices configured to perform subscriber-aware TWAMP data session provisioning, in accordance with the techniques of this disclosure.

FIG. 2 is a block diagram illustrating an example TWAMP architecture 26 including network devices configured to perform subscriber-aware TWAMP data session provisioning, in accordance with the techniques of this disclosure, so as to enable monitoring of network services at the subscriber level. In this example, TWAMP architecture 26 includes a first network device 28 and a second network device 30.

In general, first network device 28 may be any device that sources subscriber traffic (e.g., test device 21 or subscriber device 16), such as a laptop, computer, tablet, mobile device, camera, computer-enabled sensor, television, appliance or IoT device. Second network device 30 may comprise any device that processes the subscriber traffic and, in some cases, applies network services to subscriber packet flows, such as a router, e.g., router 8 from FIG. 1, any of service nodes 10 within data center 9, a firewall, IDP device or other security device, switch or the like.

In the illustrated example of FIG. 2, first network device 28 is configured to execute both a TWAMP control client 32 and a TWAMP session sender 34, and second network device 30 is configured to execute a TWAMP server 38, a TWAMP session-reflector 40 and, optionally, network services 52. TWAMP control client 32 and TWAMP session sender 34 may be connected via a communication link 46. In the illustrated example where TWAMP control client 32 and TWAMP session sender 34 are executed on the same host, communication link 46 may comprise an internal communication link, such as a memory or bus. In other examples, where TWAMP control client 32 and TWAMP session sender 34 are executed on different hosts, communication link 46 may comprise an external communication link. Similarly, TWAMP server 38 and TWAMP session reflector 40 may be connected via a communication link 48. In some examples, the different TWAMP logical roles or entities may communicate over either of communication links 46, 48 using an Extensible Messaging and Presence Protocol (XMPP) interface or any other communication protocol.

In accordance with the techniques of this disclosure, first network device 28 and second network device 30 may be configured to perform subscriber-aware TWAMP data session provisioning. In the example illustrated in FIG. 2, TWAMP control client 32 and TWAMP server 38 establish control connection 42. Control connection 42 may comprise a Transmission Control Protocol (TCP) connection such that subsequent control messages transmitted over control connection 42 comprise TCP packets. TWAMP control client 32 and TWAMP server 38 exchange control message over control connection 42 to negotiate data session 50 between TWAMP session sender 34 and TWAMP session reflector 40 for monitoring monitor key performance indicators (KPIs) at the subscriber level with respect to application of services 52 to subscriber packet flows.

As part of the negotiation process for data session 50, TWAMP control client 32 and TWAMP server 38 perform an exchange 44 of subscriber identifier (SUB-ID) that uniquely identifies a subscriber associated with first network device 28. In addition, TWAMP control client 32 may specify a SERVICE-ID that corresponds to a particular one of services 52 or combination of services 52 provided by second network device 30.

Once TWAMP control client 32 starts data session 50, TWAMP session sender 34 sends TWAMP test packets for data session 50 that include the SUB-ID to TWAMP session reflector 40. TWAMP session reflector 40 uses the SUB-ID included in the TWAMP test packets received from TWAMP session sender 34 to identify a particular subscriber corresponding to the TWAMP test packets. TWAMP session reflector 40 receives the test packets over data session 40, strips the TWAMP header so as to extract data packets from the test packets and forwards the data packets 54 to services 52 that has been negotiated for this particular test subscriber for application of one or more network services. After the services are applied to the subscriber packet flow, the resultant packets 56 are directed back to TWAMP session reflector 40, encapsulated as TWAMP test packets including the SUB-ID and one or more metrics, and sent back to TWAMP session sender 34 executing on first network device 28.

Upon receipt, TWAMP session sender 34 associates the TWAMP test packets with the subscriber based on the SUB-ID included in the TWAMP test packets. TWAMP control client 32, or some other module executed by first network device 28, may use the received metrics to compute the network performance measurements between first network device 28 and second network device 30. For example, TWAMP control client 32 may extracts timestamps that were embedded within the TWAMP packets during the round trip, thus allowing a set of latency measures to be calculated for individual subscribers and specific services or combinations of services.

In the example illustrated in FIG. 2, first network device 28 executes both TWAMP control client 32 and TWAMP session sender 34, and second network device 30 executes both TWAMP server 38 and TWAMP session-reflector 40. In other examples, each of a TWAMP control client, a TWAMP session sender, a TWAMP server, and a TWAMP session reflector may be executed on separate hosts. In this example, the TWAMP control client and the TWAMP server establish a control connection, and the TWAMP control client may instruct the TWAMP session sender to negotiate a data session with the TWAMP session reflector. Once the TWAMP control client starts the data session, the TWAMP session sender sends the TWAMP test packets including the SUB-ID to the TWAMP session reflector over the data session for application of specific network services, and receives the TWAMP test packets back from the TWAMP session reflector including the SUB-ID and one or more metrics for the data session. The TWAMP session sender may then send the received metrics to the TWAMP control client to compute the network performance measurements between the host of the TWAMP session sender and the host of the TWAMP session reflector.

Figure 3:
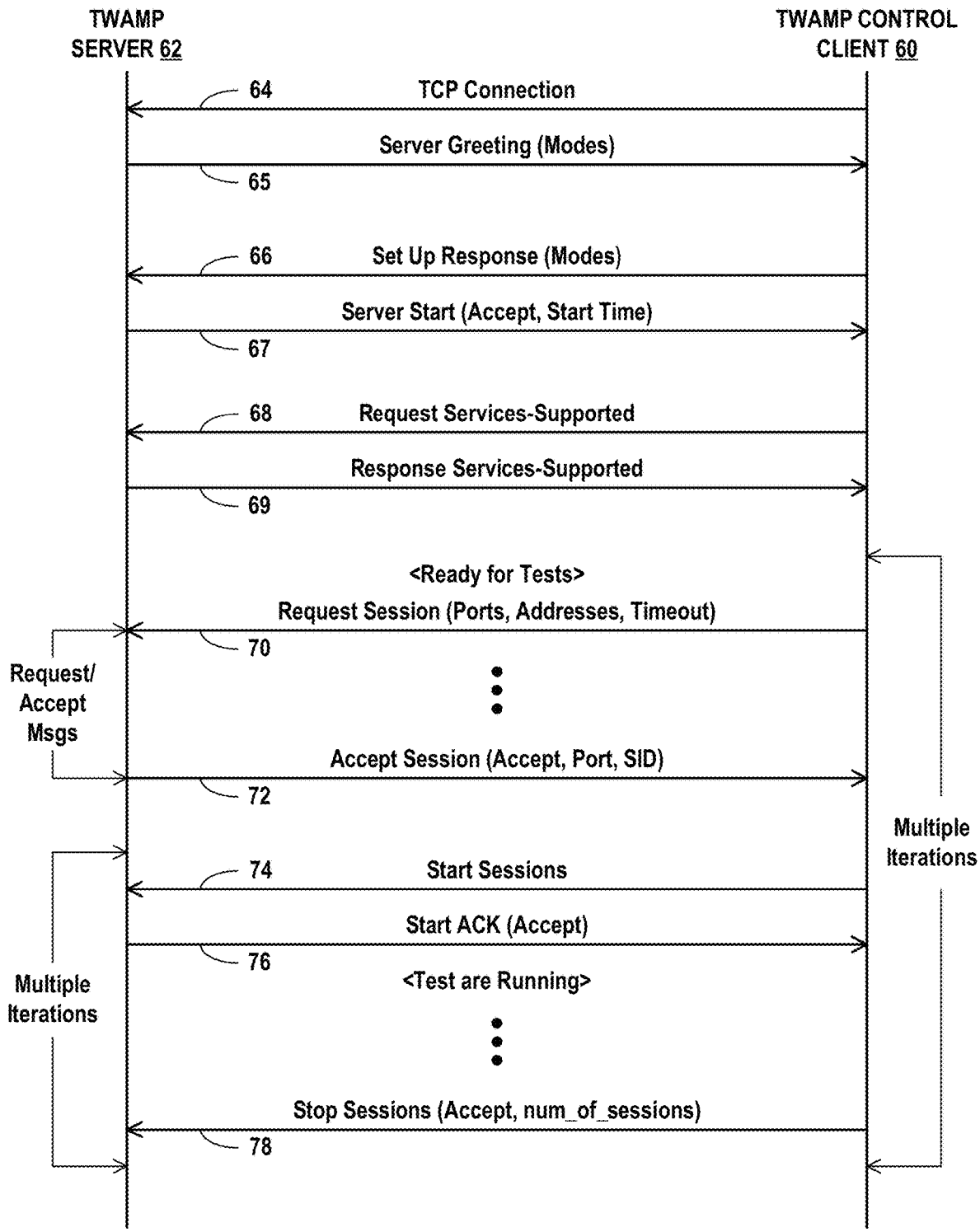
FIG. 3 is a diagram illustrating an example message sequence between a TWAMP control client and a TWAMP server, in accordance with the techniques of this disclosure.

FIG. 3 is a block diagram illustrating an example message sequence between a TWAMP control client 60 and TWAMP server 62, in accordance with the techniques of this disclosure. In some scenarios, TWAMP control client 60 may operate substantially similar to TWAMP control client 32 executed on first network device 28 from FIG. 2, and TWAMP server 62 may operate substantially similar to TWAMP server 38 executed on second network device 30 from FIG. 2. The TWAMP extensions described in this disclosure include modifications to existing control messaging between TWAMP control client 60 and TWAMP server 62, and modifications to existing data messaging between a TWAMP session sender associated with TWAMP control client 60 and a TWAMP session reflector associated with TWAMP server 62. The modification to the TWAMP data messaging is described in more detail below.

As illustrated in FIG. 3, TWAMP control client 60 and TWAMP server 62 exchange a first set of control messages to establish a control connection. In the illustrated example, the first set of control messages includes a transmission control protocol (TCP) connection 64, a server greeting message 65, a set up response message 66, a server start message 67, a request for services supported message 68 and a service supported response message 69. In other examples, the first set of control messages may include more or fewer control messages that may convey similar or different control information to establish the control connection.

According to the disclosed techniques, the first set of control messages may be modified to include a communication mode indicating whether subscriber-aware and service specific monitoring are supported. For example, TWAMP control client 60 on a first network device initiates TCP connection 64 with TWAMP server 62 on a second network device. In response, TWAMP server 62 sends server greeting message 65 to TWAMP control client 60 identifying a plurality of communication modes that are supported by TWAMP server 62, including modes that indicates that subscriber-aware active service latency measurement TWAMP data sessions are supported by TWAMP server 62. As such, server greeting message 65 may include a modes field used to indicate which communication modes are supported by TWAMP server 62. For example, the modes field may be used to identify and select specific communication capabilities. In accordance with the disclosed techniques, at least one bit position within the modes field of server greeting message 66 may be used to indicate whether the TWAMP server supports subscriber-aware data sessions.

TWAMP control client 60 selects one or more of the communication modes identified in server greeting message 65 received from TWAMP server 62 and that are also supported by TWAMP control client 60. TWAMP control client 60 then sends set up response message 66 to TWAMP server 62 identifying the selected communication modes, including the one mode that indicates that subscriber-aware TWAMP data sessions are supported by TWAMP control client 60. Set up response message 66 may include a modes field used to indicate the selected communication modes that are supported by both TWAMP control client 60 and TWAMP server 62. For example, the modes field may be used to identify and select specific communication capabilities. With the TWAMP extensions to support subscriber-aware data sessions, if TWAMP control client 60 wants to participate in subscriber-aware data session provisioning, the TWAMP control client may set the modes field as set forth in the above examples. TWAMP server responds with server start message 67 indicating whether the TCP connection has been accepted Next, according to the techniques described herein, TWAMP control client 60 issues a 'Request Service-Supported' control message 68 that queries TWAMP server 62 as to the types of network services 52 supported for testing and monitoring as described herein. In response, TWAMP server 62 issues a 'Response Service-Supported' control message 69 that, as described herein, identifies the number of network services 52 available for subscriber-aware TWAMP monitoring and, for each of the services, provides a service identifier and a service description string.

Next, TWAMP control client 60 and TWAMP server 62 then exchange a second set of control messages to negotiate one or more data sessions. In some examples, each of the one or more data sessions may be associated with a corresponding subscriber and directed to a network service 52, or combination of services 52, supported at TWAMP server 62. In the illustrated example, the second set of control messages includes a plurality of request session messages 70 and accept session messages 72, one pair for each of the one or more data sessions. In other examples, the second set of control messages may include more or fewer control messages that may convey similar or different control information to negotiate data sessions.

According to the disclosed techniques, the request session message 70 may be modified to include a subscriber identifier (SUB-ID) that uniquely identifies a subscriber, which may be a real end user/customer or a test subscriber. As examples, the SUB-ID may be an international mobile subscriber identity (IMSI), an International Mobile Equipment Identity (IMEI), an accounting identifier, an IP address or a proprietary identifier. In addition, the request session message 70 may be modified to include a service identifier that uniquely identifies one of the network services 52 provided by second network device 30. The TWAMP extensions for the second set of control messages between TWAMP control client 60 and TWAMP server 62 are described in more detail below.

TWAMP control client 60 and TWAMP server 62 may also exchange a third set of control messages to manage or control the one or more data sessions between the TWAMP session sender and the TWAMP session reflector. In the illustrated example, the third set of control messages includes a start sessions message 74, a start acknowledgment (ACK) message 76, and a stop sessions message 78. In other examples, the third set of control messages may include more or fewer control messages that may convey similar or different control information to manage the data sessions.

In response to receiving one or more accept session messages 72 for the one or more data sessions, TWAMP control client 60 sends start sessions message 74 to TWAMP server 62 to initiate testing on the requested data sessions. TWAMP server 62 responds with ACK message 76, which indicates the start of the one or more data sessions. The TWAMP session sender 34 and the TWAMP session reflector 40 then exchange test packets for each of the active data sessions.

According to the disclosed techniques, the test packets exchanged for a particular data session are modified to carry the SUB-ID in order to identify the particular subscriber associated with test packets. TWAMP session reflector 40 receives the test packets over data session 40, strips the TWAMP header so as to extract data packets from the test packets and forwards the data packets 54 to services 52 that has been negotiated for this particular test subscriber for application of one or more network services. After the services are applied to the subscriber packet flow, the resultant packets 56 are directed back to TWAMP session reflector 40, encapsulated as TWAMP test packets including the SUB-ID and one or more metrics, and sent back to TWAMP session sender 34 executing on first network device 28. The TWAMP extensions to the test packets exchanged between the TWAMP session sender associated with TWAMP control client 60 and the TWAMP session reflector associated with TWAMP server 62 are described in more detail below. At some point, TWAMP control client 60 may send stop sessions message 78 to TWAMP server 62 to stop testing on the data sessions.

Figure 4:
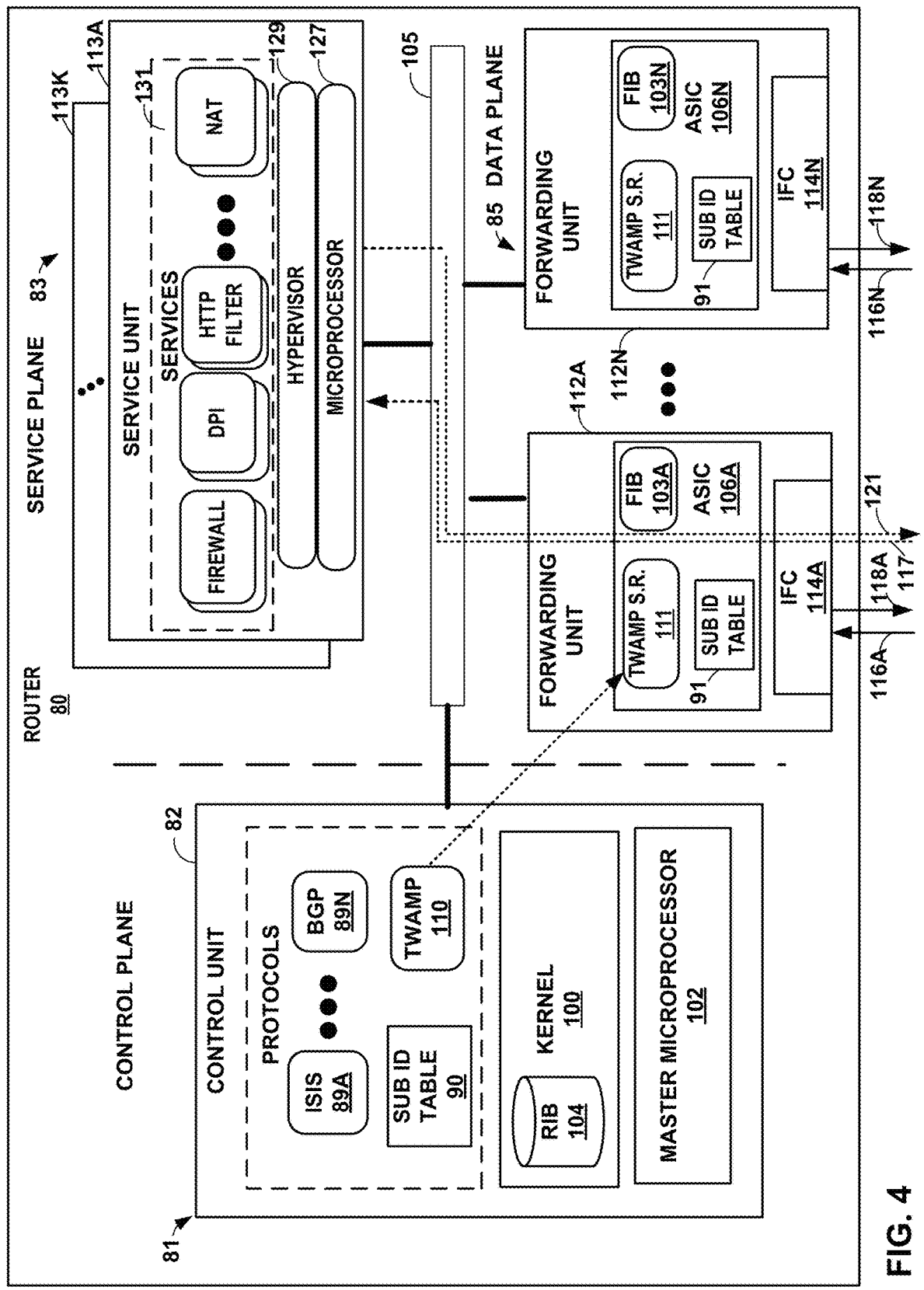
FIG. 4 is a block diagram illustrating an example router configured to execute one or more TWAMP logical roles, in accordance with the techniques of this disclosure.

FIG. 4 is a block diagram illustrating an example router 80 configured to execute one or more TWAMP logical roles, in accordance with the techniques of this disclosure. Router 80 may be described herein within the context of service provider network 2 of FIG. 1, and may represent any of routers 8, 18, for example. Moreover, while described with respect to a particular network device, e.g., a router, the techniques may be implemented by any network device that may operate as a service endpoint, such as a client device, a Layer 3 (L3) or L2/L3 switch, or server.

In this example, router 80 is divided into three logical or physical "planes" to include a control plane 81 that performs control operations for the device, a data plane 85 for forwarding transit network traffic and a service plane 83 for application of one or more network services 87 to transit packet flows that are forwarded by the router. That is, router 81 implements three separate functionalities (e.g., the routing/control, forwarding data and network service functionalities), either logically, e.g., as separate software instances executing on the same set of hardware components, or physically, e.g., as separate physical dedicated hardware components that either statically implement the functionality in hardware or dynamically execute software or a computer program to implement the functionality. In this example, a high-speed internal switch fabric 105 couples control plane 81, service plane 83, and data plane 85 to deliver data units and control messages among the units. Switch fabric 105 may represent an internal switch fabric or cross-bar, bus, or link.

In the example of FIG. 4, control plane 81 includes control unit 82 having master microprocessor(s) 102, which executes device management services, subscriber authentication and control plane routing functionality of router 80. Microprocessor 102 may comprise one or more general- or special-purpose processors such as a digital signal processor (DSP), an ASIC, a field programmable gate array (FPGA), or any other equivalent logic device. Accordingly, the terms "processor" or "controller," as used herein, may refer to any one or more of the foregoing structures or any other structure operable to perform techniques described herein.

In general, control unit 82 represents hardware or a combination of hardware and software of control that implements control plane protocols 89A-89N ("routing protocols 89") to learn and maintain routing information within routing information base 104 ("RIB 104"). RIB 104 may include information defining a topology of a network, such as service provider network of FIG. 1. Routing protocols 89 interact with kernel 100 (e.g., by way of API calls) executing on control unit 82 to update RIB 104 based on routing protocol messages received by router 80. Kernel 100 may resolve the topology defined by routing information in RIB 104 to select or determine one or more routes through the network. For example, the kernel may generate forwarding information in the form of forwarding information bases 103A-103N ("FIBs 103") based on the network topology represented in RIB 104, i.e., perform route resolution. Typically, kernel 100 generates FIBs 103 in the form of radix or other lookup trees to map packet information (e.g., header information having destination information and/or a label stack) to next hops and ultimately to interface ports of IFCs 114 associated with respective forwarding units 112. Each of FIBs 103 may associate, for example, network destinations with specific next hops and corresponding IFCs 114. For MPLS-related traffic forwarding, FIBs 103 stores, for a given FEC, label information that includes an incoming label, an outgoing label, and a next hop for a packet. Control unit 82 may then program forwarding units 112 of data plane 85 with FIBs 103, which installs the FIBs within lookup ASICs 106.

Data plane 85, in this example, is a decentralized data plane in that data plane functionality and packet forwarding functionality is distributed among a plurality of forwarding units 112A-112N ("forwarding units 112"). In the example of router 80, data plane 85 includes forwarding units 112 that provide high-speed forwarding of network traffic received by interface cards 114A-114N ("IFCs 44") via inbound links 116A-116N to outbound links 118A-118N. Forwarding units 112 may each comprise one or more packet forwarding engine ("PFE") coupled to respective interface cards 114 and may represent, for example, a dense port concentrator (DPC), modular port concentrator (MPC), flexible physical interface card (PIC) concentrator (FPC), or another line card, for example, that is insertable within a chassis or combination of chassis of router 80.

As shown in the example of FIG. 4, each of forwarding units 112 includes a respective one of lookup ASICs 106A-106N ("lookup ASICs 106") that receives control and data session traffic via IFC cards 114, performs route lookups and, based on routes installed to FIBs 103, forwards the traffic either to control unit 82 (control traffic destined for router 80) or to one of forwarding units 40 (transit data traffic) for output via an interface to one of output links 48. In one example, lookup ASICs 106 are microcode-controlled chipsets programmably configured by a slave microprocessor (not shown) executing on each of forwarding units 112. Specifically, in this example, each of ASICs 106 may be controllable by internal microcode programmed by a slave microprocessor. When forwarding packets, control logic within each lookup ASICs 106 traverses the respective FIB 103 and, upon reaching a FIB entry for the packet (e.g., a leaf node), the microcode-implemented control logic automatically selects one or more forwarding next hops (FNHs) for forwarding the packet. In this way, ASICs 106 of forwarding units 112 process packets by performing a series of operations on each packet over respective internal packet forwarding paths as the packets traverse the internal architecture of router 80. Operations may be performed, for example, on each packet based on any of a corresponding ingress interface, an ingress PFE 114, an egress PFE 114, an egress interface or other components of router 80 to which the packet is directed prior to egress, such as one or more service cards. Forwarding units 112 each include forwarding structures that, when executed, examine the contents of each packet (or another packet property, e.g., incoming interface) and on that basis make forwarding decisions, apply filters, and/or perform accounting, management, traffic analysis, and load balancing, for example.

In one example, each of forwarding units 112 arranges forwarding structures as next hop data that can be chained together as a series of "hops" along an internal packet forwarding path for the network device. In many instances, the forwarding structures perform lookup operations within internal memory of ASICs 106, where the lookup may be performed against a tree (or trie) search, a table (or index) search. Other example operations that may be specified with the next hops include filter determination and application, or a rate limiter determination and application. Lookup operations locate, within a lookup data structure (e.g., a lookup tree), an item that matches packet contents or another property of the packet or packet flow, such as the inbound interface of the packet. The result of packet processing in accordance with the operations defined by the next hop forwarding structure within ASICs 106 determines the manner in which a packet is forwarded or otherwise processed by forwarding units 112 from its input interface on one of IFCs 114 to its output interface on one of IFCs 114.

Lookup ASICs 106 may be implemented using forwarding application specific integrated circuits (ASICs), field programmable gate arrays (FPGAs), or any other equivalent integrated or discrete logic circuitry, as well as any combinations of such components. Each of forwarding units 106 may include substantially similar components to perform substantially similar functionality.

Service plane 83 of router 80 includes a plurality of service units 113A-113K ("service units 13") that may be, as examples, removable service cards, which are configured to apply network services to packets flowing through data plane 85. That is, when forwarding packets, forwarding units 112 may steer packets to service plane 83 for application of one or more network services 131 by service units 113. In this example, each of service units 113 includes a microprocessor 127 configured to execute hypervisor 129 to provide an operating environment for a plurality of network services 131. As examples, service units 113 may apply firewall and security services, carrier grade network address translation (CG-NAT), media optimization (voice/video), IPSec/VPN services, deep packet inspection (DPI), HTTP filtering, counting, accounting, charging, and load balancing of packet flows or other types of services applied to network traffic. Each of services 131 may be implemented, for example, as virtual machines or containers executed by hypervisor 129 and microprocessor 127.

In the example of FIG. 4, control unit 82 provides an operating environment for TWAMP 110. For example, control unit 82 may use TWAMP 110 to execute one or more TWAMP logical roles, such as a TWAMP control client, a TWAMP server, a TWAMP sessions sender, and a TWAMP session reflector. According to the techniques described in this disclosure, TWAMP 110 may be extended to enable subscriber-aware TWAMP data session provisioning between two endpoints in a computer network. For purposes of illustration, router 80 is described herein as a second endpoint configured to execute a TWAMP server and/or an associated TWAMP session reflector based on communications from a TWAMP client, which may be a client device or testing device associated with the subscriber network.

The disclosed techniques include extending control messaging of TWAMP 110 to include a communication mode for the subscriber-aware TWAMP data session provisioning. In this way, when operating as the TWAMP control client, router 80 is configured to negotiate support for subscriber-aware data sessions during establishment of the control connection with a TWAMP client executed on another endpoint, e.g., client device 16 from FIG. 1.

During negotiation, TWAMP 110 of router 80, operating as the TWAMP server, receives a subscriber identifier (SUB ID) of the particular data subscriber and, optionally, a selection of one or more of network services 131 to be applied to packet flows for that subscriber. Router 80 may then store the SUB ID of the particular subscriber along with any requested services 131 in SUB ID table 90. SUB ID table 90 may include a plurality of SUB IDs corresponding to a plurality of different subscribers and, optionally, may map one or more of the SUB ID to a set of one or more of services 131 to applied to packet flows associated with respect subscriber. Moreover, each of the different requested TWAMP sessions may be associated with different network performance metric(s) to be measured.

Further, router 80 may execute a TWAMP session reflector 111 ("TWAMP S.R. 111") in each forwarding unit 112 of data plane 85, and TWAMP 110 of control plane 81 may install and maintain SUB ID tables 91, including the specified SUB IDs and any selected services 131, within the forwarding units based on the negotiated TWAMP session. As further described below, the disclosed techniques further include extending data messaging of TWAMP to include a subscriber identifier (SUB ID) in each test packet for the TWAMP data session. Further, TWAMP session reflector 111 within forwarding units 112 are configured to associate received TWAMP test packets 117 with a particular subscriber based on the SUB ID included in each of the received TWAMP test packets and, optionally based on the associated subscriber, direct the subscriber packets encapsulated within the TWAMP test packets through any services 131 specified for that subscriber.

For example, the TWAMP session reflector 111 may compare the SUB ID included in an inbound TWAMP test packets 117 to SUB ID table 91 in order to identify the corresponding subscriber and any services 131 to be applied. TWAMP session reflector 111 may then strip headers from the TWAMP test packets 117 to extract subscriber data packets and forwards the subscriber data packets to the particular network services 131 for that subscriber. After the services are applied, the resultant packets are directed back to the TWAMP session reflector 111, encapsulated as TWAMP test packets 121 and sent back to the TWAMP client executing on the particular subscriber device. The TWAMP client extracts timestamps embedded within the TWAMP packets 121, thus allowing latency measures to be calculated for individual subscribers and specific services or combinations of services.

The architecture of router 80 illustrated in FIG. 4 is shown for example purposes only. This disclosure is not limited to this architecture. In other examples, router 80 may be configured in a variety of ways. In one example, router 80 may be implemented solely in software, or hardware, or may be implemented as a combination of software, hardware, or firmware. For example, control unit 82 may comprise one or more of a processor, a programmable processor, a general-purpose processor, an integrated circuit, an ASIC, a FPGA, or any type of hardware unit capable of implementing the techniques described herein. Control unit 82 may further include one or more processors which execute software instructions stored on a computer readable storage medium, such as random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, magnetic media, optical media, or other computer-readable storage media. In some instances, the computer-readable storage medium may include instructions that cause a programmable processor to perform the techniques described herein.

Figure 5:
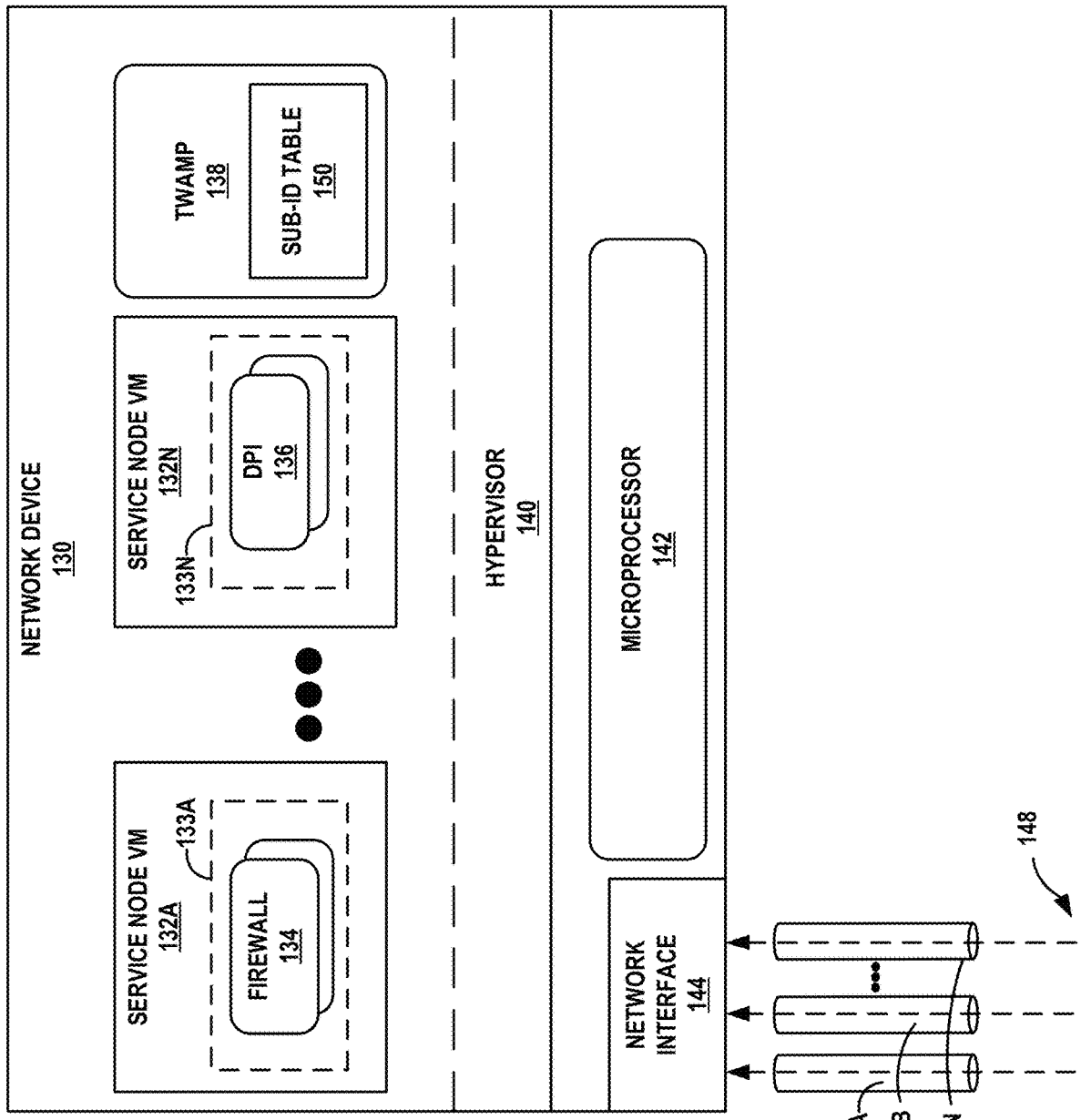
FIG. 5 is a block diagram illustrating an example network device configured to execute one or more TWAMP logical roles, in accordance with the techniques of this disclosure.

FIG. 5 is a block diagram illustrating an example network device 130 configured to execute one or more TWAMP logical roles, in accordance with the techniques of this disclosure. Network device 130 may be described within the context of service provider network 2 of FIG. 1, and may represent any of router 8, router 18, service nodes 10, or data center 9, for example. In other examples, network device 130 may comprise any network device, such as a router, a switch or a server, within service provider network 2.

In the example of FIG. 5, network device 130 includes a microprocessor 142 executing hypervisor 140 to provide an execution environment for one or more service node virtual machines (VMs) 132A-132N (collectively "service node VMs 132"). Each of service node VMs 132 executes network services applications 133A-133N (collectively "network service applications 133"), such as stateful firewall 134 and deep packet inspection (DPI) 136, to apply stateful network services to packet flows.

As illustrated in FIG. 5, network device 130 also provides an operating environment for TWAMP 138, which may execute as a separate process or VM or may be integrated within VM 132 or hypervisor 140. For example, TWAMP 138 may execute one or more TWAMP logical roles, such as a TWAMP control client, a TWAMP server, a TWAMP sessions sender, and a TWAMP session reflector. In other examples, the one or more TWAMP logical roles may be executed on a physical chassis of network device 130. According to the techniques described in this disclosure, TWAMP 138 may be extended to enable subscriber-aware TWAMP data session provisioning between two endpoints in a computer network. For purposes of illustration, TWAMP 138 is described herein as a second endpoint configured to execute a TWAMP server and/or an associated TWAMP session reflector.

The disclosed techniques include extending control messaging of TWAMP 138 to include a communication mode for the subscriber-aware TWAMP data session provisioning. In this way, when operating as the TWAMP server, TWAMP 138 is configured to negotiate support for SUB-ID-based data sessions during establishment of the control connection with a TWAMP control client executed on another endpoint, e.g., router 8 from FIG. 1.

During negotiation of a particular data session, TWAMP 138 receives a request from the TWAMP control client, wherein the request specifies a unique subscriber identifier (SUB-ID) for the particular data session. In addition, the request may specify particular network services to apply to traffic flows associated with the subscriber and/or particular KPIs to measure for the subscriber traffic. TWAMP 138 may then store the SUB-ID of the particular data session in a SID table 150 and any other optional parameters, e.g., services and or KPIs. As such, SID table 150 may include a plurality of SUB-ID corresponding to a plurality of different subscribers. In some examples, each of the entries within SUB-ID table 150 may specify a subscriber identifier and, optionally, particular subscriber network service supported at the TWAMP server and/or one or more particular KPIs to be monitored.

TWAMP 138, operating as the TWAMP server, may also communicate the SUB-ID and other parameters, such as particular services or KPIs, directly to the associated TWAMP session reflector over a communication link. In some examples, service node VM 132A may execute both the TWAMP server and the TWAMP session reflector such that the communication is an internal control communication between the TWAMP logical roles on service node VM 132A. In this case, either the TWAMP server or the TWAMP session reflector may be responsible for maintaining SUB-ID table 150.

The disclosed techniques further include extending data messaging of TWAMP 138 to include a SUB-ID assigned in each test packet for the data session. For example, the data messages may include a field specifying the SUB-ID and may also encapsulate subscriber traffic. When operating as the TWAMP session reflector, TWAMP 138 is configured to identify the subscriber and, optionally, particular services and/or KPIs corresponding to the received TWAMP test packets based on the SUB-ID included in the received test packets. Based on the determination, TWAMP 138 directs subscriber traffic encapsulated therein to the appropriate network service(s) 133. In addition, when operating as the TWAMP session reflector, service node VM 132A is configured to include the SUB-ID of the particular data session in each TWAMP test packet for the particular data session that is reflected back to a TWAMP session sender executed on another endpoint, e.g., subscriber device 16 or test device 21 from FIG. 1.

In the example illustrated in FIG. 5, network device 130 includes a network interface 144 to receive tunnel packets 148 over a plurality of tunnels 146A-146N ("tunnels 146"). Each of the tunnels 146 corresponds to a different one of a plurality of service chains, where each of the service chains comprises a different ordered set of one or more stateful network services to be applied to packet flows associated with subscribers. Each of the tunnel packets 148 encapsulates a subscriber packet. In some cases, the subscriber packet may be a TWAMP test packet injected by a TWAMP session sender associated with a TWAMP control client. The architecture of network device 130 illustrated in FIG. 5 is shown for example purposes only. This disclosure is not limited to this architecture. In other examples, network device 130 may be configured in a variety of ways.

FIGS. 6-11 are conceptual diagrams illustrating example formats of TWAMP control messages between a TWAMP control client and a TWAMP server, in accordance with the techniques of this disclosure. The set of control messages (sometimes referred to as a service block) may be exchanged between the TWAMP control client and the TWAMP server to negotiate one or more TWAMP data sessions for specific subscriber traffic and, optionally, one or more services, and to monitor the particular KPIs to be measured for each of the subscribers and services. The format of each of the messages is shown by way of examples, and the structure and formal, including the octet numbers specified for the various fields are merely examples. Moreover, in other examples the functionality of a give message may be split across multiple messages. Similarly, the example messages may be combined into a reduced number of messages.

Figure 6:
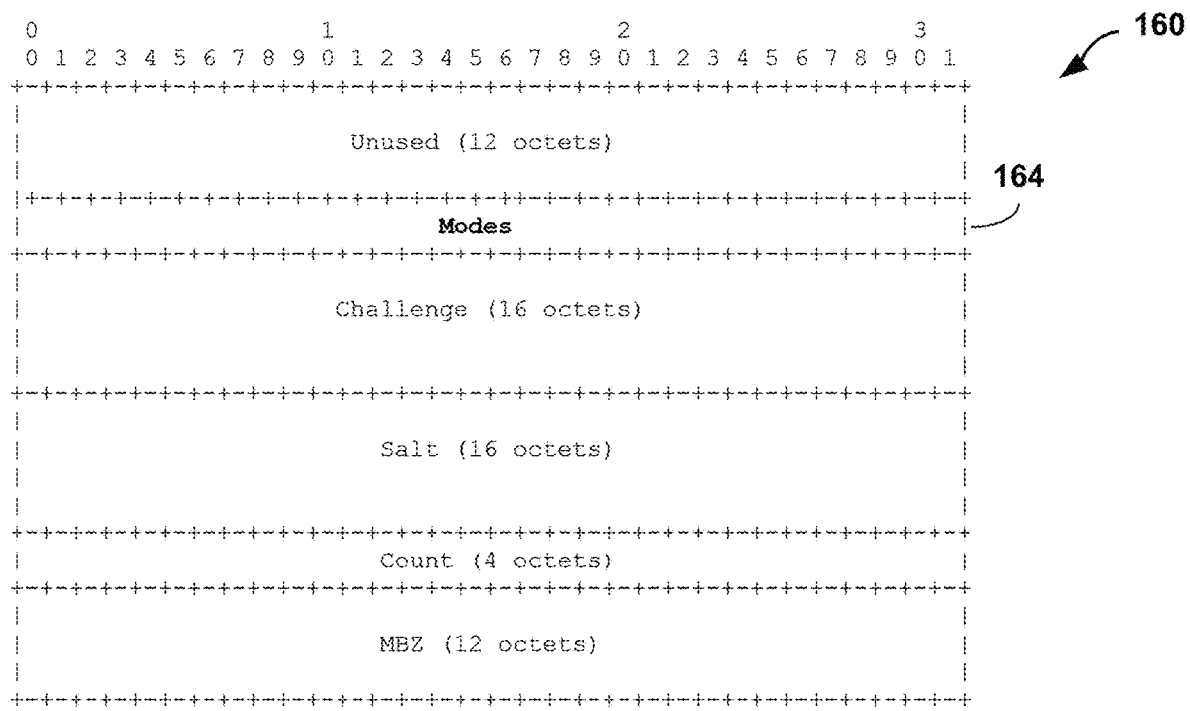

FIG. 6 illustrates an example format of a server greeting message 160 sent by the TWAMP server to the TWAMP control client in response to a control connection initiated by the TWAMP control client. The TWAMP control client may initiate the control connection with the TWAMP server using, e.g., TCP. The server greeting message illustrated in FIG. 6 includes several fields, including a modes field 164, a challenge field, a salt field, a count field, and a must be zero (MBZ) field, and in some cases an associated number of octets for each field.

Modes field 164 included in the server greeting message may be used to indicate which modes are supported by the TWAMP server. For example, modes field 164 may be used to identify and select specific communication capabilities. In accordance with the disclosed techniques, at least one bit position within the modes field of the server greeting message may be used to indicate whether the TWAMP server or a session reflector associated with the TWAMP server supports subscriber-aware monitoring of KPIs.

In one example, a $26^{th}$ bit in modes field 164 of service greeting message 66 may be used to indicate whether TWAMP server 62 supports SID-based data sessions. Conventionally, the modes field may have any of the following values: 1: unauthenticated, 3: unauthenticated+authenticated, or 7: unauthenticated+authenticated+encrypted. With TWAMP extensions to support subscriber-aware data session provisioning for service latency measurements, the modes field may have the following example values:
　0x09:unauthenticated+supports Active Service Latency Measurements
　0x0b:unauthenticated+authenticated+supports Active Service Latency Measurements
　0x0F:unauthenticated+authenticated+encrypted)+supports Active Service Latency Measurements
　0x21:unauthenticated+supports Active Service Latency Measurements+Subscriber aware
　0x23:unauthenticated+authenticated+supports Active Service Latency Measurements+Subscriber aware
　0x27:unauthenticated+authenticated+encrypted)+supports Active Service Latency Measurements+Subscriber aware In a set up response message sent by the TWAMP control client to the TWAMP server in response to server greeting message, the TWAMP control client may select any of the modes indicated in the server greeting message, and reply back to the TWAMP server with the selected mode.

Upon establishment of the control connection between the TWAMP control client and the TWAMP server, the TWAMP control client may request monitoring of KPIs for a particular subscriber and, optionally, for one or more particular services with the TWAMP server. To do so, the TWAMP control client may need to determine which services are supported at the TWAMP server and which service KPIs are supported for those services, as described herein.

Figure 7:
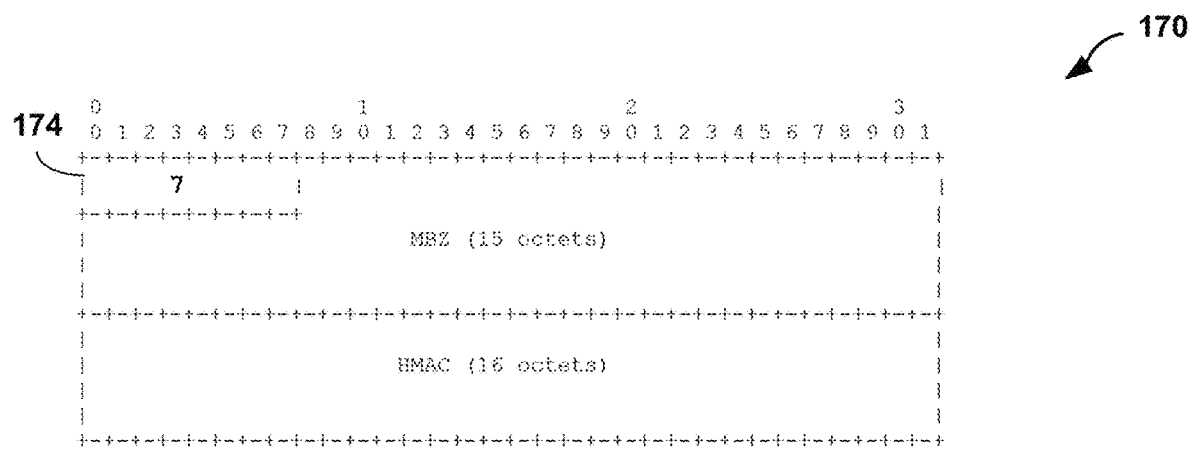

FIG. 7 illustrates an example format of a request service-supported message 170 that may be sent by the TWAMP control client to the TWAMP server to determine the network services supported by the TWAMP server or other device reachable by the TWAMP server. In this example, message 170 includes a command 174 (e.g., a value of 0x7) to request a description of the supported services.

Figure 8:
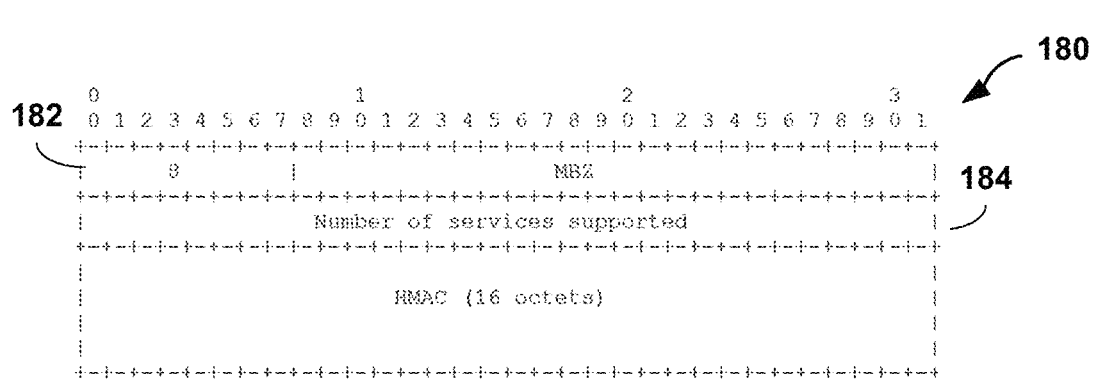

FIG. 8 illustrates an example format of a response service-supported message 180 sent by the TWAMP server to the TWAMP client control in response to request service-supported message 170. In this example, message 180 includes a command 182 (e.g., a value of 0x8) and a number of services supported 184. The TWAMP server then sends one or more messages 190 of FIG. 9 that specify pairs of service identifiers 192 and service description strings 194. After sending one or more messages 190, the TWAMP server sends message 200 of FIG. 10 specifying a hash-based message authentication code (HMAC).

Figure 11:
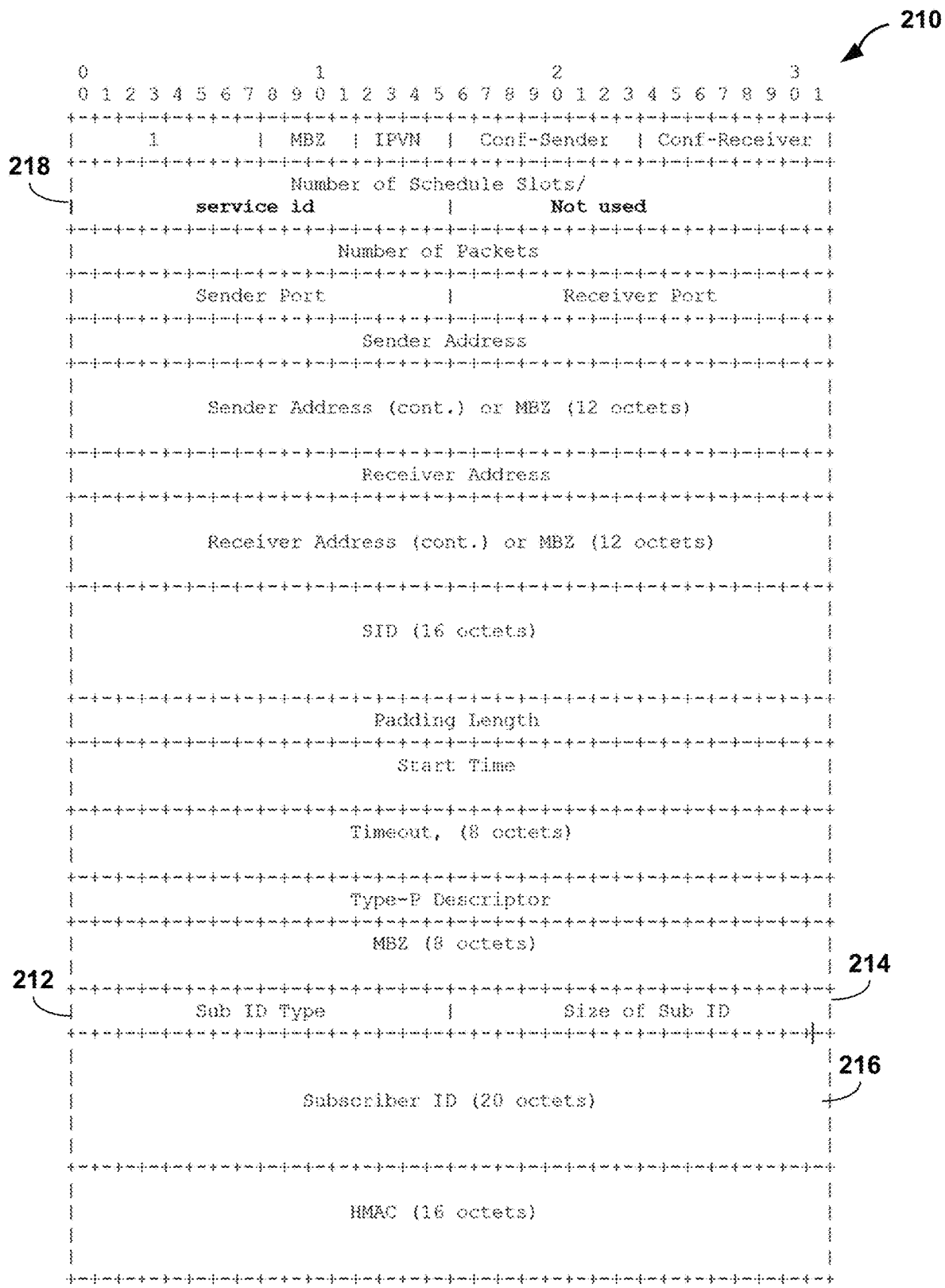

FIG. 11 illustrates an example format of a request session message 210 sent by the TWAMP control client to the TWAMP server to request a data session for a given subscriber and, optionally, for a specific service supported at the TWAMP server. As illustrated in FIG. 11, in accordance with the extension described herein, request session message 210 includes several fields, including, among others, a subscriber identifier type (SUB-ID TYPE) field 212, a size of the subscriber identifier (SIZE OF SUB-ID) field 214, and a subscriber identifier (SUB-ID) field 216 to carry the SUB ID of the particular subscriber for which the data session is being established. The type of subscriber identifier and size are specified by a SUB-ID TYPE field 212 and SIZE OF SUB-ID field 214, respectively. For example, the type of subscriber identifier may be an IMSI, an IMEI, an accounting identifier, an IP address, a proprietary identifier or the like.

In one example, request session message may further include a service ID field 218 for specifying a particular service or combination of services that the TWAMP server is to apply, or direct application to, subscriber-specific test packets to subsequently be transmitted over the TWAMP data session being requested. This service ID field may comprise two octets. If monitoring of service KPIs is not requested as a part of the requested data session, then the service ID field has a value of 0. If the service ID field has a non-zero value, then the padding length field will not have any significance because the TWAMP test packets will be of different sizes depending on which types of service KPIs are being monitored over the data session.

In response to request session message 210, the TWAMP server may reply back with an accept session message accepting the data session for the given subscriber, and including a non-zero error message in the event an error arises or the session requested is denied. In some examples, the accept session message may include an accept field having a value of 0-6, with 0 meaning success and a non-zero value meaning the control connection will be closed, and a port field indicating a port number at the TWAMP server for the accepted data session. For example, the TWAMP server may include a value of 0x6 as an error code in the event the specified subscriber identifier does not match an authorized, authenticated subscriber identifier. The TWAMP control client may then send a start sessions message to the TWAMP server, and the TWAMP server may reply with a start ACK message including an accept field having a value of 0-5, with 0 meaning success and the control connection being closed if the accept field has a non-zero value.

Upon receiving the accept session message, either the TWAMP control client or the TWAMP session initiator may start sending TWAMP test packets to the TWAMP server to measure selected service KPIs associated with the data session for the given subscriber traffic flow. At some point, the TWAMP control client or TWAMP session initiator may send a stop session message to the TWAMP server including an accept field having a value of 0 meaning normal but possibly premature completion of the data session, or having a nonzero value indicating some failure. As a result of the stop sessions message, the control connection between the TWAMP control client and the TWAMP server will be closed and all data sessions spawned over the control connection will be considered invalid. The stop session message may also include a number of sessions field. If the number of sessions field in the stop session message does not match the number of data sessions in progress, then the stop session message may be considered invalid.

Figure 12:
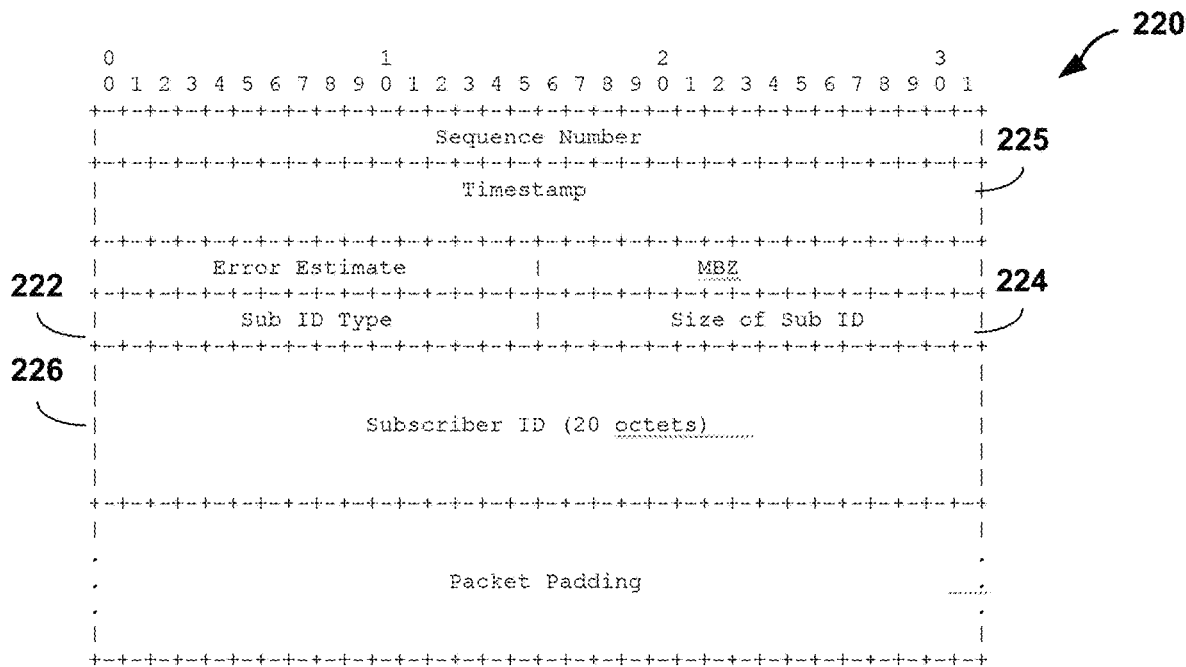
FIGS. 12-13 are conceptual diagrams illustrating example formats of TWAMP test packets for a subscriber-aware TWAMP data session between a TWAMP session sender and a TWAMP session reflector, in accordance with the techniques of this disclosure.
Figure 13:
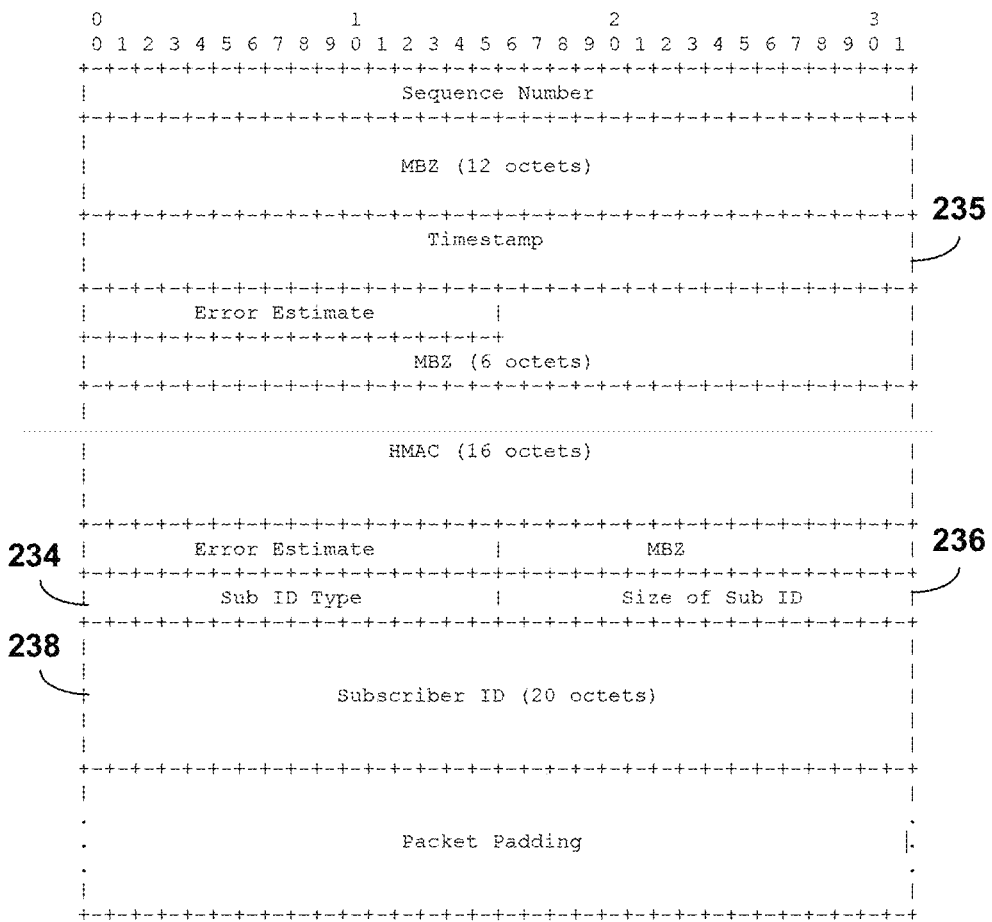

FIGS. 12-13 are conceptual diagrams illustrating example formats of TWAMP test packets for a subscriber aware TWAMP data session between a TWAMP session sender and a TWAMP session reflector, in accordance with the techniques of this disclosure. The TWAMP test packets may be exchanged to collect metrics used to measure network performance between a first network device executing the TWAMP session sender and a second network device executing the TWAMP session reflector. The techniques described in this disclosure include extensions to the TWAMP test packets and response packets to include a SUB-ID used to identify a particular subscriber associated with the traffic flow being injected into the TWAMP data session.

FIG. 12 illustrates an example format of a TWAMP test packet 220 for a data session in an unauthenticated mode. In one example of the TWAMP extensions described herein, as illustrated in FIG. 12, test packet 220 includes several fields, including a sequence number field, a timestamp field, an error estimate field, a must-be-zero (MBZ) field, a SUB-ID TYPE field 222, a SIZE OF SUB-ID field 224, a SUB-ID field 226 and packet padding for carrying encapsulated subscriber traffic. 20-octet SUB-ID field 226, as illustrated in FIG. 12, carries the SUB ID of the particular subscriber associated with the test packet is being transmitted. The type of subscriber identifier and size are specified by a SUB-ID TYPE field 222, a SIZE OF SUB-ID field 224, thereby aiding correct processing of the subscriber identifier by the TWAMP server upon receiving test packet 220. For example, the type of subscriber identifier may be an IMSI, an IMEI, an accounting identifier, an IP address, a proprietary identifier or the like.

FIG. 13 illustrates an example format of a TWAMP test packet 230 for a data session in authenticated and encrypted modes. In one example of the TWAMP extensions described herein, as illustrated in FIG. 13, test packet 230 includes several fields, including a sequence number field, a must-be-zero (MBZ) field, a timestamp field, an error estimate field, a second MBZ field, an HMAC field, a second error estimate field, a third MBZ field, a SUB-ID TYPE field 234, a SIZE OF SUB-ID field 226, a SUB-ID field 238 and packet padding for encapsulating subscriber traffic. 20-octet SUB-ID field 238 carries the SUB ID of the particular subscriber associated with the test packet is being transmitted. The type of subscriber identifier and size are specified by a SUB-ID TYPE field 234, a SIZE OF SUB-ID field 236, thereby aiding correct processing of the subscriber identifier by the TWAMP server upon receiving test packet 230. For example, the type of subscriber identifier may be an IMSI, an IMEI, an accounting identifier, an IP address, a proprietary identifier or the like.

Figure 14:
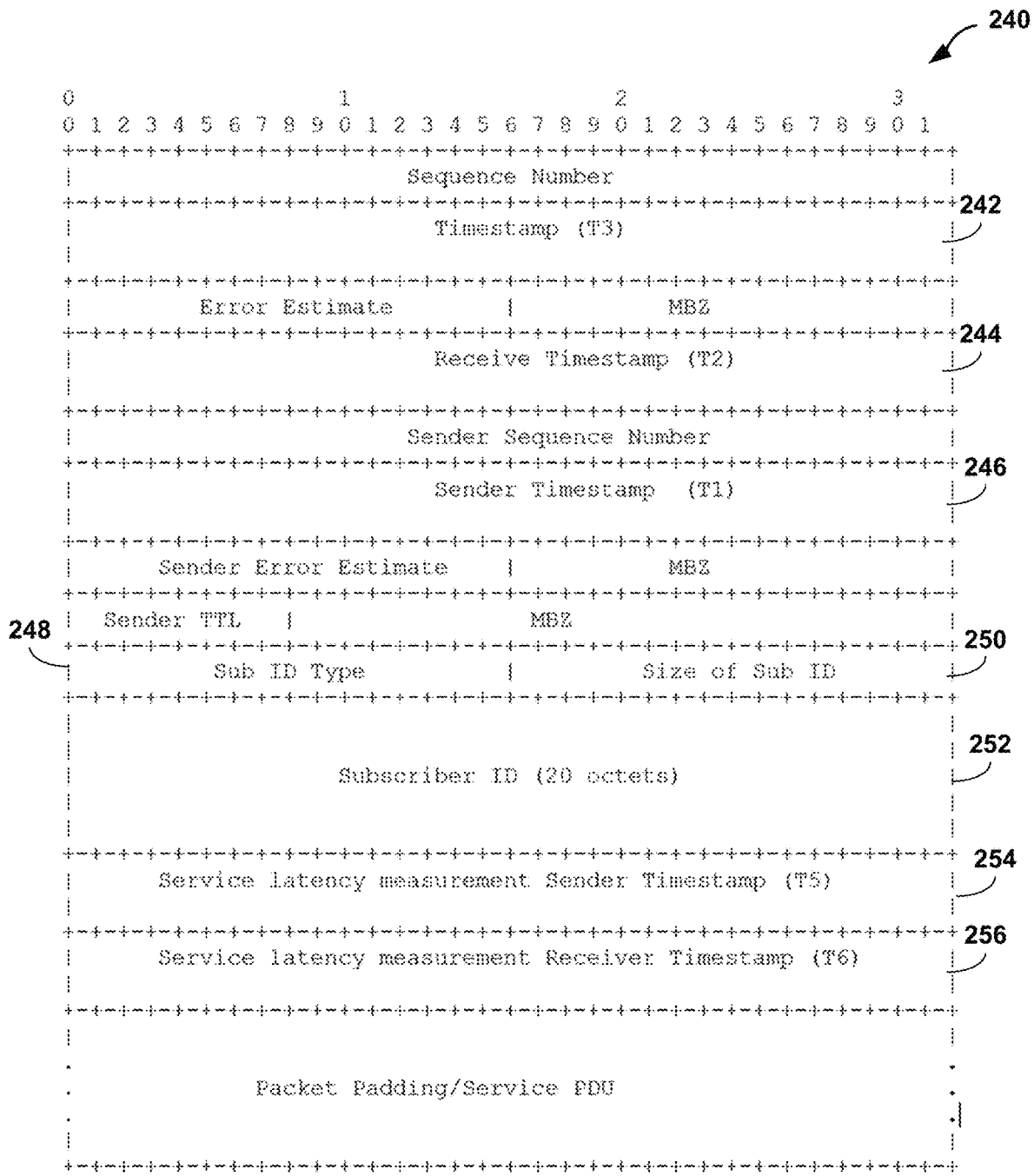

FIG. 14 illustrates an example format of a TWAMP reply message 240 for the unauthenticated mode as sent by the session reflector associated with the TWAMP server to the session sender associated with either the TWAMP control client or the TWAMP session initiator over an established data session.

As illustrated in FIG. 14, the example session TWAMP reply message 240 includes several fields, including a sequence number field, a timestamp field 242, an error estimate field, an MBZ field, a receive timestamp field 244, a send sequence number field, a sender timestamp field 246, a send error estimate field, an MBZ field, a sender time to live (TTL) field, an MBZ field, a SUB-ID TYPE field 248, a SIZE OF SUB-ID field 250, a SUB-ID field 252, a service latency sender timestamp 254, a service latency receiver timestamp 256 and packet padding that may include one or more service PDUs such as subscriber traffic as processed by the TWAMP server.

FIG. 15 illustrates an example format of a TWAMP reply message 260 for the authenticated and encrypted modes as sent by the session reflector associated with the TWAMP server to the session sender associated with either the TWAMP control client or the TWAMP session initiator over an established data session.

As illustrated in FIG. 15, the example session TWAMP reply message 240 includes several fields, including a sequence number field, an MBZ field, timestamp field 262, an error estimate field, an MBZ field, a receive timestamp field 264, an MBZ field, a send sequence number field, an MBZ field, a sender timestamp field 265, a send error estimate field, an MBZ field, a sender time to live (TTL) field, an MBZ field, a HMAC field, a SUB-ID TYPE field 266, a SIZE OF SUB-ID field 268, a SUB-ID field 270, a service latency sender timestamp 272, a service latency receiver timestamp 274 and packet padding that may include one or more service PDUs such as subscriber traffic as processed by the TWAMP server.

Figure 16:
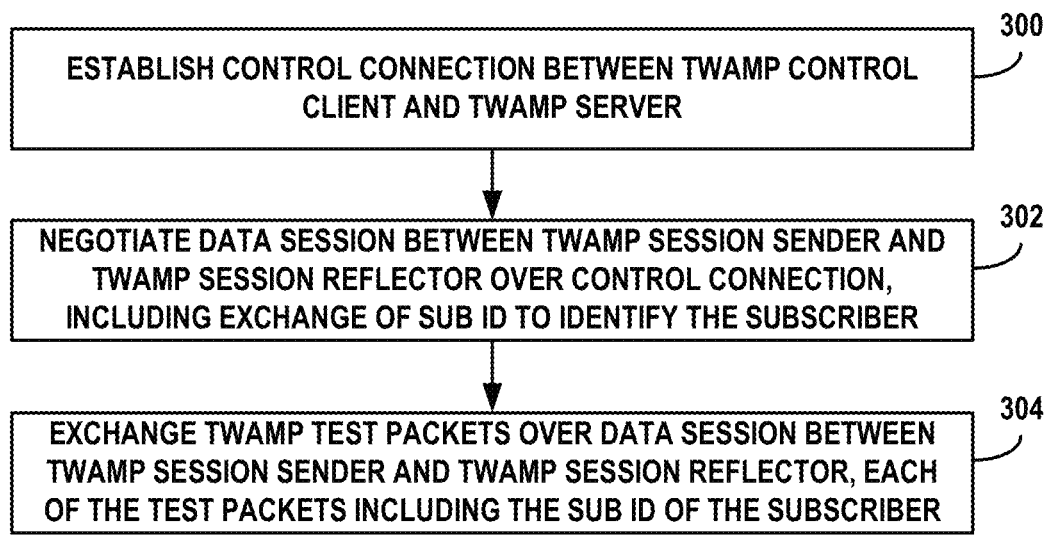
FIG. 16 is a flowchart illustrating an example operation of negotiating a subscriber-aware TWAMP data session, in accordance with the techniques of this disclosure.

FIG. 16 is a flowchart illustrating an example operation of negotiating a subscriber-aware TWAMP data session, in accordance with the techniques of this disclosure. The example operation of FIG. 16 is described with respect to TWAMP control client 32 and TWAMP session sender 34 executed on first network device 28 (such as a client device or a test device), and TWAMP server 38 and TWAMP session reflector 40 executed on second network device 30 (such as a router or service node) from FIG. 2. In other examples, the operation illustrated in FIG. 16 may be performed by a TWAMP control client, a TWAMP session sender, a TWAMP server, and a TWAMP session reflector that are each executed on separate hosts.

TWAMP control client 32 on first network device 28 and TWAMP server 38 on second network device 30 establish control connection 42 (300). When establishing control connection 42, TWAMP control client 32 and TWAMP server 36 may negotiate communication and security options for future data sessions established by TWAMP control client 32 and TWAMP server 36. According to the techniques of this disclosure, TWAMP server 38 identifies a plurality of supported communication modes, one or more of which indicates that subscriber-aware TWAMP data sessions are supported by TWAMP server 38. TWAMP control client 32 then determines which of the plurality of supported communication modes are also supported by TWAMP control client 32, and selects at least one of the communication modes for the future data sessions. According to the disclosed techniques, the selected one of the communication modes indicates that subscriber-aware TWAMP data sessions are supported by both TWAMP control client 32 and TWAMP server 38.

TWAMP control client 32 and TWAMP server 38 then use control connection 42 to negotiate a data session, e.g., data session 50, between TWAMP session sender 34 and TWAMP session reflector 40 for specific subscriber traffic (302). As part of the negotiation process for data session 50, TWAMP control client 32 and TWAMP server 38 perform an exchange 44 of a subscriber identifier (SUB-ID) that uniquely identifies a subscriber associated with first network device 28. In addition, TWAMP control client 32 may specify a SERVICE-ID that corresponds to a particular one of services 52 or combination of services 52 provided by second network device 30.

Once TWAMP control client 32 starts data session 50, TWAMP session sender 34 and TWAMP session reflector 40 exchange one or more TWAMP test packets for data session 50 with each of the one or more TWAMP test packets including the SUB-ID of subscriber associated with the data session 50 (304). According to the disclosed techniques, TWAMP session sender 34 and TWAMP session reflector 40 use the SUB-ID included in the TWAMP test packets to identify the particular subscriber associated with the TWAMP test packets, and the TWAMP server may determine one or more services to apply to the test packets before returning TWAMP test packets to the TWAMP control client.

Figure 17:
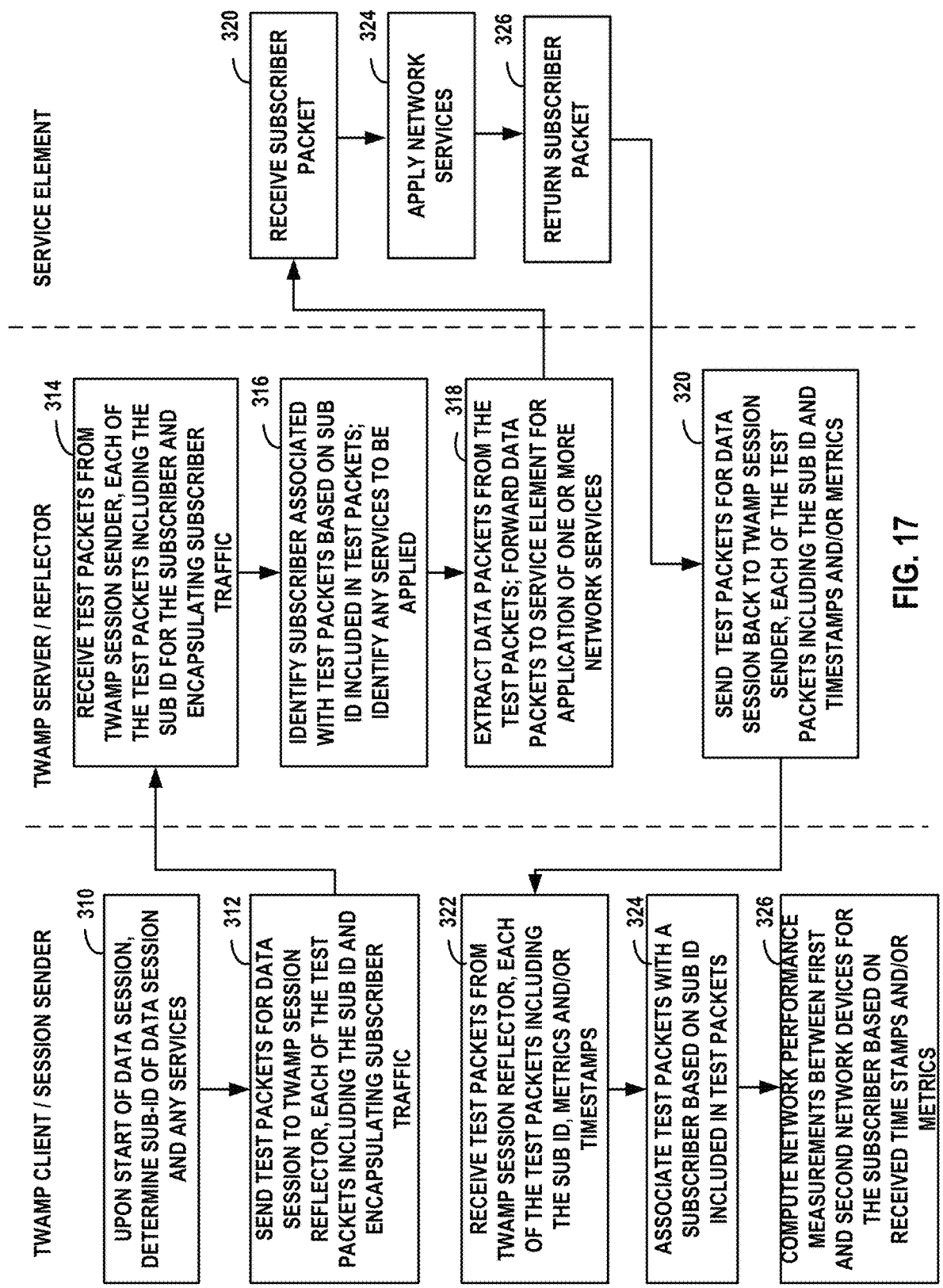
FIG. 17 is a flowchart illustrating an example operation of exchanging TWAMP test packets for a subscriber-aware TWAMP data session between a TWAMP session sender executed on a first network device and a TWAMP session reflector executed on a second network device, in accordance with the techniques of this disclosure.

FIG. 17 is a flowchart illustrating an example operation of exchanging TWAMP test packets for the subscriber-aware TWAMP data session between a TWAMP session sender executed on a first network device and a TWAMP session reflector executed on a second network device, in accordance with the techniques of this disclosure. The example operation is described with respect to TWAMP session sender 34 executed on first network device 28, and TWAMP session reflector 40 executed on second network device 30 from FIG. 2.

As described in detail above, TWAMP control client 32 and TWAMP server 38 may establish control connection 42, and negotiate data session 50 including exchange 44 of the SID of data session 50. Once TWAMP control client 32 starts data session 50, TWAMP session sender 34 determines the SUB-ID of the subscriber associated with the TWAMP data session 50, i.e., the identity of the subscriber associated with the subscriber traffic to be monitored by the TWAMP session (310). TWAMP session sender 34 then constructs and outputs one or more TWAMP test packets for data session 50 to TWAMP session reflector 40 with each of the TWAMP test packets including the SUB-ID of the subscriber and where the payload encapsulates subscriber traffic (312).

TWAMP session reflector 40 receives the TWAMP test packets from TWAMP session sender 34 with each of the TWAMP test packets including the SUB-ID for the subscriber (314). In response to receiving the TWAMP test packets, TWAMP session reflector 40 identifies the subscriber associated with of the received TWAMP test packets based on the SUB ID included in the TWAMP test packets and determines any services to be applied to the subscriber packets encapsulated therein (316). In one example, TWAMP session reflector 40 may identify the subscriber using a SUB ID table maintained by either TWAMP server 38 or TWAMP session reflector 40, e.g., SUB ID table 91 of FIG. 4 or SUB ID table 150 from FIG. 5. For example, TWAMP session reflector 40 may compare the SUB ID included in the received TWAMP test packets to the plurality of SUB IDs recorded in the SUB ID table in order to identify the subscriber and, optionally, identify any services to be applied to the subscriber traffic.

The TWAMP session reflector within router 8 or service node 10 removes the data packets from the test packets and forwards the data packets to the service element, e.g., any of service units 132 of router 80 or service nodes 132 of network device 130 for application of one or more network services (318). The service element receives the subscriber packet (320), applies network services to the subscriber packet (324) and returns the subscriber packet to the TWAMP session reflector (326).

TWAMP session reflector 40 correlates the subscriber packet with the original inbound TWAMP packet, constructs an outbound TWAMP packet to include any metrics and/or timestamps originally recorded in the inbound TWAMP packet, and then sends the TWAMP test packets for data session 50 back to TWAMP session sender 34 with each of the TWAMP test packets including the SUB ID of the subscriber and one or more metrics for data session 50 used to measure network performance between first network device 28 and second network device 30 for the given subscriber (320). For example, the metrics may include timestamps for sending or receiving a test packet, error estimates for sending or receiving the test packet, a sequence number for sending the test packet, a TTL value for the test packet, a keepalive PDU, and/or a count of serviced packets, bytes, or subscribers. In one example, TWAMP session reflector 40 may correlate packets received from the service element with the original inbound TWAMP packet using cookies. For example, the TWAMP session reflector may attach a cookie to each subscriber packet forwarded to the service element, which the service element returns along with the subscriber packet after application of network services. In this way, the TWAMP session provider may utilize the cookies to correlate the subscriber traffic processed by the service elements with the original TWAMP packets received from the client.

TWAMP session sender 34 receives the TWAMP test packets from TWAMP session reflector 40 with each of the TWAMP test packets including the SID and the metrics (322). Upon receiving the TWAMP test packets from TWAMP session reflector 40, TWAMP session sender 32 associates the received TWAMP test packets with the corresponding subscriber based on the SUB ID included in the TWAMP test packets (324). For example, TWAMP session sender 34 may compare the SUB ID included in the received TWAMP test packets to the plurality of SUB IDs in order to identify the subscriber.

TWAMP control client 32, or some other module executed by first network device 28 or by a centralized controller such as the SDN controller or orchestration engine, may then compute network performance measurements between first network device 28 and second network device 30 for the given subscriber based on the received metrics for data session 50 (194). For example, TWAMP control client 32 may compute one or more of keepalive or path connectivity measurements, RTT measurements, path delay measurements, packet jitter measurements, packet re-ordering measurements, packet loss measurements, service latency measurements, or service load measurements based on the received metrics.

EXAMPLE

The following illustrates an example in which the techniques described herein are used to measure latency for application of network service(s) to data packets for a given subscriber. For purposes of illustration the following example is described in reference to the example format of TWAMP data packets shown in FIGS. 12-15.

1. Initially, the TWAMP client/session sender constructs the TWAMP data packet 220 or 230, depending on the mode, (step 312 of FIG. 17) by embedding a subscriber packet in the packet padding of the TWAMP data packet, setting the values within the various fields including SUB ID TYPE, SIZE OF SUB ID and SUB ID field, and setting the timestamp 225, 235 (T3) to record the time the TWAMP data packet is sent it to the TWAMP reflector.
2. Upon receiving the TWAMP test packet (step 314 of FIG. 17), the TWAMP server/reflector records the receipt time in timestamp 244 of a TWAMP reply message 240 or 250 depending upon the mode (T2). In addition, the TWAMP server/reflector sets timestamp 242 (T3) to contain the value of timestamp 225, 235 at which the original TWAMP packet was sent by the TWAMP client.
3. Next, the TWAMP server updates service latency measurement timestamp 254 (T5) of the TWAMP reply message to record the time the inner subscriber packet was extracted and sent to the selected service(s) (step 318 of FIG. 17). In one example, the TWAMP server maintains the context of the data packet by attaching a cookie to the subscriber packet which is returned by the service element.
4. Upon receiving the subscriber packet back from the service element, including the cookie, the TWAMP server updates service latency receiver timestamp 256 (T6) in the TWAMP reply packet to record the time the subscriber packet was received back from the service element (step 320 of FIG. 17).
5. At this time, the TWAMP server embeds the service PDU in the TWAMP reply message, sets the timestamp (T3) 242 to record the time the TWAMP reply message is sent back the TWAMP reflector and outputs the TWAMP data packet.
6. The TWAMP client, upon receiving the TWAMP packet for a particular subscriber, records the current timestamp, represented herein as T4.
7. With all the timestamps available, TWAMP client or a centralized controller can compute the following example metrics:

a. Round Trip Time (RTT)=$((T4-T1)-(T3-T2))$ b. Service latency per subscriber=$(T6-T5)$ The techniques described in this disclosure may be implemented, at least in part, in hardware, software, firmware or any combination thereof. For example, various aspects of the described techniques may be implemented within one or more processors, including one or more microprocessors, DSPs, ASICs, FPGAs, or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include RAM, ROM, PROM, EPROM, EEPROM, flash memory, a hard disk, a CD-ROM, a floppy disk, a cassette, magnetic media, optical media, or another computer-readable storage media. It should be understood that the term "computer-readable storage media" refers to physical storage media, and not signals, carrier waves, or other transient media.

Various aspects of this disclosure have been described. These and other aspects are within the scope of the following claims.

What is claimed is:

1. A computer-readable medium comprising instructions that configure a processor to:

establish a control connection between a two-way active measurement protocol (TWAMP) control client and a TWAMP server;

negotiate, by the TWAMP control client and the TWAMP server over the control connection, a data session between a TWAMP session sender executed on a first network device and a TWAMP session reflector executed on a second network device, wherein negotiating the data session includes specifying a subscriber identifier to an individual subscriber of a service provider network; and exchange one or more TWAMP test packets for the data session between the TWAMP session sender and the TWAMP session reflector, each of the one or more TWAMP test packets including the subscriber identifier of the subscriber.

2. The computer-readable medium of claim 1, wherein the instruction configure the processor to negotiate the data session by receiving, with the TWAMP server and from the TWAMP control client, a TWAMP session request that specifies the subscriber identifier for the individual subscriber.

3. The computer-readable medium of claim 2, wherein the TWAMP session request includes a subscriber identifier type field that specifies the subscriber identifier for the individual subscriber.

4. The computer-readable medium of claim 3, wherein the subscriber identifier type field specifies one of an (IMSI), an International Mobile Equipment Identity (IMEI), an accounting identifier or an IP address for the individual subscriber.

5. The computer-readable medium of claim 1, wherein the instruction configure the processor to establish the control connection by:

sending, by the TWAMP server and to the TWAMP control client, a greeting message that identifies a plurality of communication modes that are supported by the TWAMP server, wherein one of the plurality of communication modes indicates that subscriber-aware data sessions are supported by the TWAMP server; and receiving, by the TWAMP server and from the TWAMP control client, a set up message that identifies at least one of the plurality of communication modes that is also supported by the TWAMP control client, wherein the at least one of the plurality of communication modes indicates that subscriber-aware data sessions are supported by the TWAMP control client.

6. The computer-readable medium of claim 1, wherein the instruction configure the processor to establish the control connection by:

receiving, by the TWAMP control client and from the TWAMP server, a greeting message that identifies a plurality of communication modes that are supported by the TWAMP server, wherein one of the plurality of communication modes indicates that subscriber-aware data sessions are supported by the TWAMP server;

selecting, by the TWAMP control client, at least one of the plurality of communication modes that is also supported by the TWAMP control client; and sending, by the TWAMP control client and to the TWAMP server, a set up message that identifies the at least one of the plurality of communication modes, wherein the at least one of the plurality of communication modes indicates that subscriber-aware data sessions are supported by the TWAMP control client.

7. The computer-readable medium of claim 1, wherein the instruction configure the processor to exchange the one or more TWAMP test packets for the data session by:

receiving, by the TWAMP session reflector, the one or more TWAMP test packets for the data session from the TWAMP session sender, each of the one or more TWAMP test packets including the subscriber identifier associated with the data session; and sending, by the TWAMP session reflector, the one or more TWAMP test packets back to the TWAMP session sender, each of the one or more TWAMP test packets including the subscriber identifier associated with the data session and at least one metric for the data session used to measure network performance between the first network device and the second network device.

8. The computer-readable medium of claim 7, further comprising instructions that configure the processor to, for each of the one or more TWAMP test packets and prior to sending the one or more TWAMP test packets back to the TWAMP session sender:

extract, by the TWAMP session reflector, a subscriber packet embedded within a payload of the respective TWAMP test packet;

select, based on the subscriber identifier associated with the data session, a network service;

direct the subscriber packet to be processed by the selected network service;

receive a processed subscriber packet from the network service after processing by the network service; and send, by the TWAMP session reflector, the respective TWAMP test packet back to the TWAMP session sender in response to receive the processed subscriber packet from the network service.

9. The computer-readable medium of claim 8, further comprising instructions that configure the processor to, for each of the one or more TWAMP test packets and prior to sending the one or more TWAMP test packets back to the TWAMP session sender:

set a timestamp within the TWAMP test packet indicating when the TWAMP test packet was received by the TWAMP session reflector;

set a timestamp within the TWAMP test packet indicating when the subscriber packet of the TWAMP test packet was directed by the TWAMP session reflector to the selected network service;

set a timestamp within the TWAMP test packet indicating when the processed subscriber packet was received back from the network service by the TWAMP session reflector; and set a timestamp within the TWAMP test packet indicating when the TWAMP test packet was send by the TWAMP session reflector to the TWAMP session sender.

10. The computer-readable medium of claim 1, wherein the instruction configure the processor to exchange the one or more TWAMP test packets for the data session by:

sending, by the TWAMP session sender, the one or more TWAMP test packets for the data session to the TWAMP session reflector, each of the one or more TWAMP test packets including the subscriber identifier;

receiving, by the TWAMP session sender, the one or more TWAMP test packets back from the TWAMP session reflector, each of the one or more TWAMP test packets including the subscriber identifier and at least one metric for the data session used to measure network performance between the first network device and the second network device; and associating, by the TWAMP session sender, the one or more TWAMP test packets with the subscriber of the service provider network based on the subscriber identifier included in the one or more TWAMP test packets.

11. The computer-readable medium of claim 10,
wherein each of the one or more TWAMP test packets sent by the TWAMP session sender to the TWAMP session reflector includes a subscriber packet embedded within a payload of the respective TWAMP test packet,
wherein each of the TWAMP test packets received by the TWAMP session sender from the TWAMP session reflector includes:
  a timestamp within the TWAMP test packet indicating when the TWAMP test packet was received by the TWAMP session reflector,
  a timestamp within the TWAMP test packet indicating when the subscriber packet embedded of the TWAMP test packet was extracted and directed by the TWAMP session reflector to a network service for processing,
  a timestamp within the TWAMP test packet indicating when a processed subscriber packet was received back from the network service by the TWAMP session reflector, and
  a timestamp within the TWAMP test packet indicating when the TWAMP test packet was sent by the TWAMP session reflector back to the TWAMP session sender.

12. A mobile device comprising:
a memory; and
one or more processors in communication with the memory and executing a two-way active measurement protocol (TWAMP) control client, the one or more processors configured to:
  establish a control connection between the TWAMP control client and a TWAMP server,
  negotiate a data session with a TWAMP session reflector executed on a second network device, wherein negotiating the data session includes specifying a subscriber identifier for an individual subscriber of a service provider network,
  send the one or more TWAMP test packets for the data session to the TWAMP session reflector, each of the one or more TWAMP test packets including the subscriber identifier, and
  receive the one or more TWAMP test packets back from the TWAMP session reflector, each of the one or more TWAMP test packets including the subscriber identifier and at least one metric for the data session used to measure network performance between the network device and the second network device.

13. The mobile device of claim 12,
wherein each of the one or more TWAMP test packets sent to the TWAMP session reflector includes a subscriber packet embedded within a payload of the respective TWAMP test packet,
wherein each of the TWAMP test packets received from the TWAMP session reflector includes:
  a timestamp within the TWAMP test packet indicating when the TWAMP test packet was received by the TWAMP session reflector,
  a timestamp within the TWAMP test packet indicating when the subscriber packet of the TWAMP test packet was directed by the TWAMP session reflector to a network service for processing,
  a timestamp within the TWAMP test packet indicating when the processed subscriber packet was received back from the network service by the TWAMP session reflector, and
  a timestamp within the TWAMP test packet indicating when the TWAMP test packet was sent by the TWAMP session reflector.

14. A router comprising:
a plurality of forwarding units, each of the forwarding executing a two-way active measurement protocol (TWAMP) session reflector; and
a control unit having one or more processors executing a TWAMP server, the one or more processors configured to:
  establish a control connection between the TWAMP server and a TWAMP control client,
  receive, with the TWAMP server and from the TWAMP control client, a TWAMP session request for a data session with a TWAMP session sender associated with the TWAMP control client, wherein the TWAMP session request specifies a subscriber identifier to an individual subscriber of a service provider network,
  receive one or more TWAMP test packets for the data session from the TWAMP session sender by one or more of the TWAMP session reflectors, each of the one or more TWAMP test packets including the subscriber identifier associated with the data session, and
  send, by the respective one of the TWAMP session reflectors that received the packets, the one or more TWAMP test packets back to the TWAMP session sender, each of the one or more TWAMP test packets including the subscriber identifier associated with the data session and at least one metric for the data session used to measure network performance between the router and the TWAMP session sender.

* * * * *